United States Patent
Cai et al.

(10) Patent No.: US 11,433,833 B2
(45) Date of Patent: Sep. 6, 2022

(54) SYSTEM AND METHOD FOR IMPLEMENTING AUTOMOBILE ELECTRONIC CONTROL FUNCTION

(71) Applicant: Huawei Technologies Co., Ltd., Shenzhen (CN)

(72) Inventors: Jianyong Cai, Shanghai (CN); Xiaohua Chen, Shanghai (CN); Yalin Liu, Shanghai (CN); Shuaihua Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/336,869

(22) Filed: Jun. 2, 2021

(65) Prior Publication Data

US 2021/0291763 A1 Sep. 23, 2021

Related U.S. Application Data

(63) Continuation of application No. PCT/CN2020/100380, filed on Jul. 6, 2020.

(30) Foreign Application Priority Data

Sep. 12, 2019 (CN) .......................... 201910867047.0

(51) Int. Cl.
*B60R 16/02* (2006.01)
*B60R 16/023* (2006.01)
(Continued)

(52) U.S. Cl.
CPC ........ *B60R 16/0232* (2013.01); *G06K 9/6267* (2013.01); *G07C 5/008* (2013.01); *G07C 5/0816* (2013.01)

(58) Field of Classification Search
CPC ............ B60R 16/0232; B60R 16/023; G06K 9/6267; G07C 5/0816; G07C 5/008;
(Continued)

(56) References Cited

U.S. PATENT DOCUMENTS

2003/0144784 A1 7/2003 Tashiro et al.
2006/0111825 A1 5/2006 Okada et al.
(Continued)

FOREIGN PATENT DOCUMENTS

CN 106790204 A 5/2017
CN 106828139 A 6/2017
(Continued)

OTHER PUBLICATIONS

Parts Geek: Discount Auto Part and Accessory, [Online], Available: https://www.partsgeek.com/ [Accessed: Aug. 12, 2021 for "Honda Accord 2014"]. (Year: 2014).*

*Primary Examiner* — Nader Bolourchi
(74) *Attorney, Agent, or Firm* — Conley Rose, P.C.

(57) ABSTRACT

A system includes obtaining a plurality of automobile part sets through classification based on at least one of the following factors an interface type of an interface of an automobile part, a transmission type used by the automobile part to transmit data, a manufacturer of the automobile part, a type of the automobile part, a safety level of the automobile part, a service type of a service to which data transmitted by the automobile part belongs, or a service level of the service to which the data transmitted by the automobile part in the automobile belongs.

20 Claims, 9 Drawing Sheets

(51) Int. Cl.
*G06K 9/62* (2022.01)
*G07C 5/00* (2006.01)
*G07C 5/08* (2006.01)

(58) Field of Classification Search
CPC ........ G07C 5/0841; B60W 2050/0002; B60W 2050/0057; B60W 50/0098; B60Y 2304/05
See application file for complete search history.

(56) References Cited

U.S. PATENT DOCUMENTS

| | | |
|---|---|---|
| 2012/0182935 A1 | 7/2012 | Addepalli et al. |
| 2014/0215491 A1* | 7/2014 | Addepalli ............. H04W 40/02 719/313 |
| 2018/0076970 A1* | 3/2018 | Han ........................ H04L 12/46 |
| 2019/0058611 A1* | 2/2019 | Maeda .................... H04L 12/46 |

FOREIGN PATENT DOCUMENTS

| | | |
|---|---|---|
| CN | 108891409 A | 11/2018 |
| CN | 109116844 A | 1/2019 |
| CN | 109532719 A | 3/2019 |
| CN | 109729128 A | 5/2019 |
| CN | 109917765 A | 6/2019 |
| CN | 209030252 U | 6/2019 |
| CN | 109995628 A | 7/2019 |
| JP | 2017061278 A | 3/2017 |
| JP | 2018085686 A | 5/2018 |

* cited by examiner

SYSTEM AND METHOD FOR IMPLEMENTING AUTOMOBILE ELECTRONIC CONTROL FUNCTION

CROSS-REFERENCE TO RELATED APPLICATIONS

This application is a continuation of International Patent Application No. PCT/CN2020/100380 filed on Jul. 6, 2020, which claims priority to Chinese Patent Application No. 201910867047.0 filed on Sep. 12, 2019, both of which are hereby incorporated by reference in their entireties.

TECHNICAL FIELD

This application relates to the automobile field, and more specifically, to a system and a method for implementing an automobile electronic control function, and an automobile.

BACKGROUND

Nowadays, intelligentization, networking, electrification, and sharing have become development trends in the automobile field. The development trends are usually implemented based on a system for implementing an automobile electronic control function. Currently, the system for implementing the automobile electronic control function mainly includes a plurality of types of electronic control elements a central computing platform (CCP), a domain control unit (DC), and an electronic control unit (ECU).

The CCP is configured to provide a data processing function for data of an entire automobile. The DC is configured to control a plurality of automobile parts in a functional domain. Generally, based on functions of the automobile parts, the DC may be classified into a power assembly domain controller, a vehicle safety domain controller, a vehicle body domain controller, an intelligent cockpit domain controller (CDC), an intelligent driving domain controller, and the like. The ECU is located in an automobile part and has the electronic control function. For example, the ECU may control the automobile part according to a control instruction. For another example, the ECU may process to-be-transmitted data in the automobile part.

To adapt to the development trends in the automobile field, the automobile needs to implement more functions, and there are more electronic control elements, especially ECUs located in the automobile parts, in the system for implementing the automobile electronic control function. Usually, one or more ECUs are disposed in each automobile part having an electronic control function in the automobile, and each ECU needs to have a control function, a computing function, and the like. This causes high costs of the ECUs, and high costs of the automobile parts carrying the ECUs.

SUMMARY

This application provides a system and method for implementing an automobile electronic control function, and an automobile, to reduce costs of automobile parts in the automobile.

According to a first aspect, this application provides a system for implementing an automobile electronic control function. The system includes a plurality of automobile parts and a vehicle integration unit (VIU). The VIU is in communication connection with the plurality of automobile parts, and the VIU is configured to obtain control information of the plurality of automobile parts. The VIU is configured to control the plurality of automobile parts based on the control information. The plurality of automobile parts belong to a first part set, the first part set is one of a plurality of part sets included in the automobile, and the plurality of part sets are obtained through classification based on one or more of the following factors an interface type of an interface of an automobile part in the automobile, a transmission type used by the automobile part in the automobile to transmit data, a manufacturer of the automobile part in the automobile, a type of the automobile part in the automobile, a safety level of the automobile part in the automobile, a service type of a service to which data transmitted by the automobile part in the automobile belongs, and a service level of the service to which the data transmitted by the automobile part in the automobile belongs.

In this embodiment of this application, the automobile parts are classified based on one or more of the foregoing factors, to obtain a plurality of automobile part sets. Each automobile part set is served by one VIU, and the VIU replaces ECUs of a plurality of automobile parts in the automobile part set, to implement a control function. Therefore, an ECU in each automobile part does not need to control the automobile part separately in a conventional system for implementing an automobile electronic control function, to simplify functions of the ECUs in the automobile parts. This helps reduce costs of the ECUs in the automobile parts, and finally reduce costs of the automobile parts.

Further, classifying the automobile parts based on one or more of the foregoing factors is conducive to improving rationality of classifying the automobile parts set.

In another aspect, in the system for implementing the automobile electronic control function provided in this application, the plurality of automobile parts may be connected to one first VIU, and connected to a DC by using the first VIU. Therefore, each automobile part in the conventional system for implementing the automobile electronic control function does not need to be connected to the DC by using a respective harness, and this helps reduce a length of the harness in the system for implementing the automobile electronic control function.

In a possible implementation, the factors further include functions of the automobile parts in the automobile, and/or physical positions of the automobile parts in the automobile.

In this embodiment of this application, the plurality of automobile part sets are obtained through classification based on the functions of the automobile parts, so that functions of VIUs serving the automobile part sets are relatively similar. This helps reduce complexity of implementing functions of the VIUs.

In a possible implementation, the VIU is configured to implement some or all electronic control functions of the plurality of automobile parts. In other words, the VIU is configured to implement some or all functions of ECUs located inside the plurality of automobile parts.

In this embodiment of this application, the VIU implements some or all functions of ECUs located inside the plurality of automobile parts, to simplify functions of the ECUs in the automobile parts, to help reduce costs of the ECUs in the automobile parts, and finally to reduce the costs of the automobile parts.

Optionally, the ECUs in the plurality of automobile parts no longer perform the some or all of the functions.

In this embodiment of this application, the VIU implements some or all functions of ECUs located inside the plurality of automobile parts, and correspondingly, the automobile parts no longer need to have all ECU functions. This helps reduce costs of the automobile parts.

Optionally, the ECUs are not disposed in the plurality of automobile parts.

In this embodiment of this application, the VIU implements some or all functions of ECUs located inside the plurality of automobile parts, and correspondingly, the automobile parts no longer need to have the ECUs, to help reduce costs of the automobile parts.

In a possible implementation, the VIU is further configured to obtain data from the plurality of automobile parts, and process the data. The processing includes one or more of the following operations performing data processing on the data, performing protocol conversion on the data, encapsulating the data according to a transmission protocol, performing data format conversion on the data, and forwarding the data.

In this embodiment of this application, the VIU processes the data of the plurality of automobile parts, in other words, the VIU replaces the ECUs in the plurality of automobile parts, to implement the foregoing processing function. This helps reduce costs of the ECUs in the automobile parts.

In a possible implementation, the VIU collects the data from execution elements and/or sensitive elements of the plurality of automobile parts.

In this embodiment of this application, the VIU may directly collect the data from the sensitive elements and/or the execution elements of the plurality of automobile parts, in other words, replace the ECUs in the plurality of automobile parts to collect the data. This helps reduce costs of the automobile parts.

In a possible implementation, the VIU is configured to receive the control information sent by a DC of the automobile, receive a CCP of the automobile, or generate the control information.

According to a second aspect, a system for implementing an automobile electronic control function is provided. The system includes a plurality of automobile parts and a VIU, and the VIU is in communication connection with the plurality of automobile parts. The VIU is configured to obtain data from the plurality of automobile parts, and the VIU is configured to process the data. The plurality of automobile parts belong to a first part set, the first part set is one of a plurality of part sets included in the automobile, and the plurality of part sets are obtained through classification based on one or more of the following factors an interface type of an interface of an automobile part in the automobile, a transmission type used by the automobile part in the automobile to transmit data, a manufacturer of the automobile part in the automobile, a type of the automobile part in the automobile, a safety level of the automobile part in the automobile, a service type of a service to which data transmitted by the automobile part in the automobile belongs, or a service level of a service to which data transmitted by the automobile part in the automobile belongs.

In this embodiment of this application, the automobile parts are classified based on one or more of the foregoing factors, to obtain the plurality of automobile part sets. Each automobile part set is served by one VIU, and the VIU replaces ECUs of a plurality of automobile parts in the automobile part set, to implement a control function. Therefore, an ECU in each automobile part does not need to control the automobile part separately in a conventional system for implementing an automobile electronic control function, to simplify functions of the ECUs in the automobile parts. This helps reduce costs of the ECUs in the automobile parts, and finally reduce costs of the automobile parts.

Further, classifying the automobile parts based on one or more of the foregoing factors is conducive to improving rationality of classifying the automobile parts set.

In another aspect, in the system for implementing the automobile electronic control function provided in this application, the plurality of automobile parts may be connected to one first VIU, and connected to a DC by using the first VIU. Therefore, each automobile part in the conventional system for implementing the automobile electronic control function does not need to be connected to the DC by using a respective harness, and this helps reduce a length of the harness in the system for implementing the automobile electronic control function.

In a possible implementation, the factors further include functions of the automobile parts in the automobile, and/or physical positions of the automobile parts in the automobile.

In this embodiment of this application, the plurality of automobile part sets are obtained through classification based on the functions of the automobile parts, so that functions of VIUs serving the automobile part sets are relatively similar. This helps reduce complexity of implementing functions of the VIUs.

In a possible implementation, the VIU is configured to implement some or all electronic control functions of the plurality of automobile parts. In other words, the VIU is configured to implement some or all functions of ECUs located inside the plurality of automobile parts.

In this embodiment of this application, the VIU implements some or all functions of ECUs located inside the plurality of automobile parts, to simplify functions of the ECUs in the automobile parts, to help reduce costs of the ECUs in the automobile parts, and finally to reduce the costs of the automobile parts.

Optionally, the ECUs in the plurality of automobile parts no longer perform the some or all of the functions.

In this embodiment of this application, the VIU implements some or all functions of ECUs located inside the plurality of automobile parts, and correspondingly, the automobile parts no longer need to have all ECU functions. This helps reduce costs of the automobile parts.

Optionally, the ECUs are not disposed in the plurality of automobile parts.

In this embodiment of this application, the VIU implements some or all functions of ECUs located inside the plurality of automobile parts, and correspondingly, the automobile parts no longer need to have the ECUs, to help reduce costs of the automobile parts.

In a possible implementation, the processing includes one or more of the following operations performing data processing on the data, performing protocol conversion on the data, encapsulating the data according to a transmission protocol, and performing data format conversion on the data.

In this embodiment of this application, the VIU processes the data of the plurality of automobile parts, in other words, the VIU replaces the ECUs in the plurality of automobile parts, to implement the foregoing processing function. This helps reduce costs of the ECUs in the automobile parts.

In a possible implementation, the VIU is configured to process the data to obtain processed data, send the processed data to a DC of the automobile or a CCP of the automobile.

In this embodiment of this application, the VIU may directly collect the data from the sensitive elements and/or the execution elements of the plurality of automobile parts, in other words, replace the ECUs in the plurality of automobile parts to collect the data. This helps reduce costs of the automobile parts.

In a possible implementation, the VIU is configured to forward the data to a DC of the automobile or a CCP of the automobile.

According to a third aspect, a method for implementing an automobile electronic control function is provided. The automobile includes the VIU and a plurality of automobile parts. The method includes the VIU obtains control information of the plurality of automobile parts, and the VIU controls the plurality of automobile parts based on the control information, where the plurality of automobile parts belong to a first part set, the first part set is one of a plurality of part sets included in the automobile, and the plurality of part sets are obtained through classification based on one or more of the following factors an interface type of an interface of an automobile part in the automobile, a transmission type used by the automobile part in the automobile to transmit data, a manufacturer of the automobile part in the automobile, a type of the automobile part in the automobile, a safety level of the automobile part in the automobile, a service type of a service to which data transmitted by the automobile part in the automobile belongs, and a service level of the service to which the data transmitted by the automobile part in the automobile belongs.

In this embodiment of this application, the automobile parts are classified based on one or more of the foregoing factors, to obtain a plurality of automobile part sets. Each automobile part set is served by one VIU, and the VIU replaces ECUs of a plurality of automobile parts in the automobile part set, to implement a control function. Therefore, an ECU in each automobile part does not need to control the automobile part separately in a conventional system for implementing an automobile electronic control function, to simplify functions of the ECUs in the automobile parts. This helps reduce costs of the ECUs in the automobile parts, and finally reduce costs of the automobile parts.

Further, classifying the automobile parts based on one or more of the foregoing factors is conducive to improving rationality of classifying the automobile parts set.

In another aspect, in the system for implementing the automobile electronic control function provided in this application, the plurality of automobile parts may be connected to one first VIU, and connected to a DC by using the first VIU. Therefore, each automobile part in the conventional system for implementing the automobile electronic control function does not need to be connected to the DC by using a respective harness, and this helps reduce a length of the harness in the system for implementing the automobile electronic control function.

In a possible implementation, the factors further include functions of the automobile parts in the automobile, and/or physical positions of the automobile parts in the automobile.

In this embodiment of this application, the plurality of automobile part sets are obtained through classification based on the functions of the automobile parts, so that functions of VIUs serving the automobile part sets are relatively similar. This helps reduce complexity of implementing functions of the VIUs.

In a possible implementation, the VIU is configured to implement some or all electronic control functions of the plurality of automobile parts. In other words, the VIU is configured to implement some or all functions of ECUs located inside the plurality of automobile parts.

In this embodiment of this application, the VIU implements some or all functions of ECUs located inside the plurality of automobile parts, to simplify functions of the ECUs in the automobile parts, to help reduce costs of the ECUs in the automobile parts, and finally to reduce the costs of the automobile parts.

Optionally, the ECUs in the plurality of automobile parts no longer perform the some or all of the functions.

In this embodiment of this application, the VIU implements some or all functions of ECUs located inside the plurality of automobile parts, and correspondingly, the automobile parts no longer need to have all ECU functions. This helps reduce costs of the automobile parts.

Optionally, the ECUs are not disposed in the plurality of automobile parts.

In this embodiment of this application, the VIU implements some or all functions of ECUs located inside the plurality of automobile parts, and correspondingly, the automobile parts no longer need to have the ECUs, to help reduce costs of the automobile parts.

In a possible implementation, the method further includes the VIU obtains data from the plurality of automobile parts, and the VIU processes the data, where the processing includes one or more of the following operations performing data processing on the data, performing protocol conversion on the data, encapsulating the data according to a transmission protocol, performing data format conversion on the data, and forwarding the data.

In this embodiment of this application, the VIU processes the data of the plurality of automobile parts, in other words, the VIU replaces the ECUs in the plurality of automobile parts, to implement the foregoing processing function. This helps reduce costs of the ECUs in the automobile parts.

In a possible implementation, that the VIU obtains to-be-transmitted data from the plurality of automobile parts includes the VIU collects the data from execution elements and/or sensitive elements of the plurality of automobile parts.

In this embodiment of this application, the VIU may directly collect the data from the sensitive elements and/or the execution elements of the plurality of automobile parts, in other words, replace the ECUs in the plurality of automobile parts to collect the data. This helps reduce costs of the automobile parts.

In a possible implementation, that the VIU obtains control information of the plurality of automobile parts includes the VIU receives the control information sent by a DC of the automobile or a CCP of the automobile, or the VIU generates the control information.

According to a fourth aspect, a method for implementing an automobile electronic control function is provided. The automobile includes the VIU and a plurality of automobile parts. The method includes the VIU obtains data from the plurality of automobile parts, and the VIU processes the data. The plurality of automobile parts belong to a first part set, the first part set is one of a plurality of part sets included in the automobile, and the plurality of part sets are obtained through classification based on one or more of the following factors an interface type of an interface of an automobile part in the automobile, a transmission type used by the automobile part in the automobile to transmit data, a manufacturer of the automobile part in the automobile, a type of the automobile part in the automobile, a safety level of the automobile part in the automobile, a service type of a service to which data transmitted by the automobile part in the automobile belongs, or a service level of a service to which data transmitted by the automobile part in the automobile belongs.

In this embodiment of this application, the automobile parts are classified based on one or more of the foregoing factors, to obtain a plurality of automobile part sets. Each automobile part set is served by one VIU, and the VIU replaces ECUs of a plurality of automobile parts in the automobile part set, to implement a control function. Therefore, an ECU in each automobile part does not need to control the automobile part separately in a conventional system for implementing the automobile electronic control function, to simplify functions of the ECUs in the automobile parts. This helps reduce costs of the ECUs in the automobile parts, and finally reduce costs of the automobile parts.

Further, classifying the automobile parts based on one or more of the foregoing factors is conducive to improving rationality of classifying the automobile parts set.

In another aspect, in the system for implementing the automobile electronic control function provided in this application, the plurality of automobile parts may be connected to one first VIU, and connected to a DC by using the first VIU. Therefore, each automobile part in the conventional system for implementing the automobile electronic control function does not need to be connected to the DC by using a respective harness, and this helps reduce a length of the harness in the system for implementing the automobile electronic control function.

In a possible implementation, the factors further include functions of the automobile parts in the automobile, and/or physical positions of the automobile parts in the automobile.

In this embodiment of this application, the plurality of automobile part sets are obtained through classification based on the functions of the automobile parts, so that functions of VIUs serving the automobile part sets are relatively similar. This helps reduce complexity of implementing functions of the VIUs.

In a possible implementation, the VIU is configured to implement some or all electronic control functions of the plurality of automobile parts. In other words, the VIU is configured to implement some or all functions of ECUs located inside the plurality of automobile parts.

In this embodiment of this application, the VIU implements some or all functions of ECUs located inside the plurality of automobile parts, to simplify functions of the ECUs in the automobile parts, to help reduce costs of the ECUs in the automobile parts, and finally to reduce the costs of the automobile parts.

Optionally, the ECUs in the plurality of automobile parts no longer perform the some or all of the functions.

In this embodiment of this application, the VIU implements some or all functions of ECUs located inside the plurality of automobile parts, and correspondingly, the automobile parts no longer need to have all ECU functions. This helps reduce costs of the automobile parts.

Optionally, the ECUs are not disposed in the plurality of automobile parts.

In this embodiment of this application, the VIU implements some or all functions of ECUs located inside the plurality of automobile parts, and correspondingly, the automobile parts no longer need to have the ECUs, to help reduce costs of the automobile parts.

In a possible implementation, the processing includes one or more of the following operations performing data processing on the data, performing protocol conversion on the data, encapsulating the data according to a transmission protocol, and performing data format conversion on the data.

In this embodiment of this application, the VIU processes the data of the plurality of automobile parts, in other words, the VIU replaces the ECUs in the plurality of automobile parts, to implement the foregoing processing function. This helps reduce costs of the ECUs in the automobile parts.

In a possible implementation, that the VIU processes the data includes the VIU processes the data to obtain processed data. The method further includes the VIU sends the processed data to a DC of the automobile or a CCP of the automobile.

In this embodiment of this application, the VIU may directly collect the data from the sensitive elements and/or the execution elements of the plurality of automobile parts, in other words, replace the ECUs in the plurality of automobile parts to collect the data. This helps reduce costs of the automobile parts.

In a possible implementation, that the VIU processes the data includes the VIU forwards the data to the DC of the automobile or the CCP of the automobile.

According to a fifth aspect, this application further provides an automobile. The automobile includes any system for implementing an automobile electronic control function according to the first aspect or the second aspect.

According to a sixth aspect, a VIU is provided. The VIU may be a controller in an automobile, or may be a chip in an automobile. The VIU may include a processing unit and an obtaining unit. The processing unit may be a processor, and the obtaining unit may be an input/output interface. The VIU may further include a storage unit. The storage unit may be a memory. The storage unit is configured to store an instruction. The processing unit executes the instruction stored in the storage unit, so that the VIU performs the steps performed by the first VIU in the foregoing aspects.

Optionally, the storage unit may be a storage unit (for example, a register or a cache) in the VIU, or an external storage unit (for example, a read-only memory (ROM) or a random-access memory (RAM)) of the VIU.

In the sixth aspect, that a memory is coupled to a processor may be understood as that the memory is located in the processor, or the memory is located outside the processor, so that the memory is independent of the processor.

According to a seventh aspect, a computer program product is provided. The computer program product includes computer program code, and when the computer program code is run on a computer, the computer is enabled to perform the methods in the foregoing aspects.

It should be noted that some or all of the computer program code may be stored in a first storage medium. The first storage medium may be encapsulated with a processor, or may be encapsulated separately from a processor. This is not specifically limited in this embodiment of this application.

According to an eighth aspect, a computer-readable medium is provided. The computer-readable medium stores program code, and when the computer program code is run on a computer, the computer is enabled to perform the methods in the foregoing aspects.

DESCRIPTION OF EMBODIMENTS

The following describes technical solutions of this application with reference to accompanying drawings.

Figure 1:
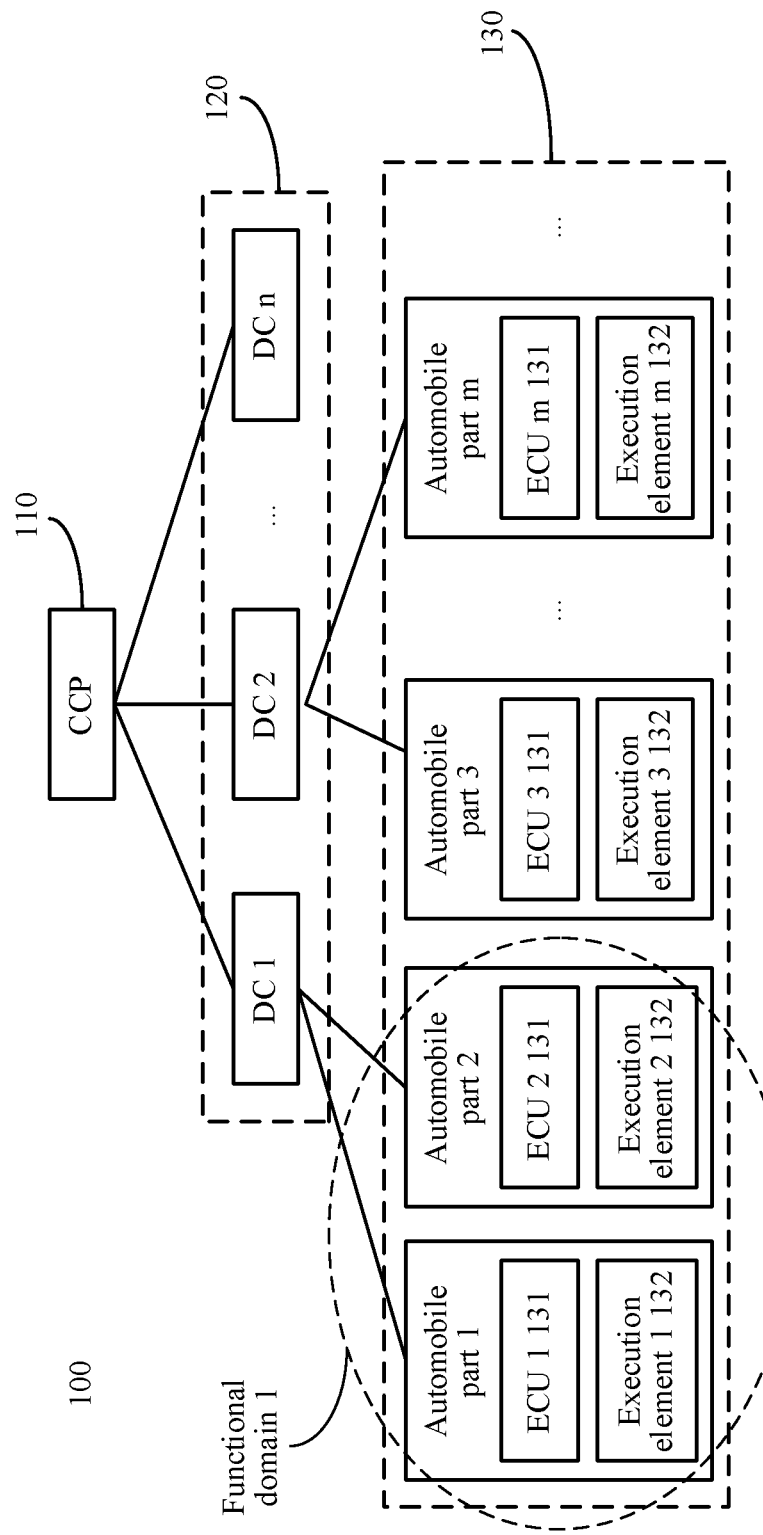
FIG. 1 is a schematic diagram of a conventional system for implementing an automobile electronic control function.

FIG. 1 is a schematic diagram of a conventional system for implementing an automobile electronic control function. As shown in FIG. 1, the system 100 for implementing the automobile electronic control function includes a CCP 110, n DCs 120, and m automobile parts 130, where n and m are positive integers.

The CCP 110 is in communication connection with the n DCs, and may receive data sent by the DCs, or send control information to the DCs. The CCP 110 may be understood as a general platform for automobile electronic control and information processing. Distributed computing and control systems (for example, ECUs or DCs) in the automobile are optimized and integrated to implement network-based and integrated control and management of functional modules of automobile computing, control, and communication, and maximize real-time sharing of software and hardware resources, such as automobile computing and control.

Each DC 120 is configured to manage a functional domain in the automobile, in other words, the DC is in communication connection with a plurality of automobile parts located in a functional domain. The DC 120 is configured to control an automobile part in a corresponding functional domain, or provide a data processing function for an automobile part in a corresponding functional domain.

Functional domains are usually classified based on functions of automobile parts in the automobile, and each functional domain has an independent domain controller, namely, a DC. Generally, the DC in an automobile may include a self-driving domain controller, a CDC, a vehicle body domain controller (VDC), and the like.

The self-driving domain controller is configured to provide services for automobile parts in an intelligent driving domain. The automobile parts in the intelligent driving domain include a monocular camera lens, a binocular camera lens, a millimeter-wave radar, a lidar, an ultrasonic radar, and the like.

It should be noted that a function of the foregoing self-driving domain controller may be implemented by a mobile data center (MDC).

The CDC is configured to provide a service for automobile parts in a cockpit domain. The automobile parts in the cockpit domain include a head-up display, an instrument display, a radio, navigation, a surround camera lens, and the like.

The VDC is configured to provide a service for automobile parts in a vehicle body domain and automobile parts in a chassis domain. The automobile parts in the vehicle body domain include a door/window lifting controller, an electric rearview mirror, an air conditioner, a central door lock, and the like. The automobile parts in the chassis domain include an automobile part in a braking system, an automobile part in a steering system, a throttle, and the like.

An automobile part 130 may specifically include an ECU 131 and an execution element 132. For example, the automobile part 130 may be a sensor or an actuator in the automobile.

The ECU 131 is located in the automobile part, and is configured to provide electronic control functions for the automobile part. For example, the ECU 131 is an ECU in a rain wiper, an ECU located in an automobile door, and the like.

The electronic control functions mainly include a logic control function and a data processing function. The logic control function includes controlling, based on the obtained control information, the automobile part to perform an operation, for example, controlling an action of the rain wiper based on the control information, for another example, controlling an on/off state of a door lock on the automobile door based on the control information. The data processing function includes processing to-be-processed data in the automobile part. For example, the data processing function includes performing data fusion on weather information collected by using a sensible element of the rain wiper and running data of the rain wiper. For another example, the data processing function includes performing data fusion on fingerprint information obtained by using a sensible element of the door lock on the automobile door and on/off state information of the automobile door.

It should be noted that, unless otherwise specified, the ECU in this embodiment of this application refers to an electronic control element located in the automobile part, and is different from an "electronic control unit" (also referred to as an engine control unit) in other approaches. The engine control unit is located outside a plurality of automobile parts in an engine system, is configured to control the plurality of automobile parts in the engine system, and may be considered as an independent centralized controller. However, the ECU in this embodiment of this application, namely, an "ECU" below, indicates an ECU located in the automobile part. For example, the ECU may be ECUs located in the plurality of automobile parts in the engine system.

It should be noted that FIG. 1 shows only a possible implementation of a system for implementing an automobile electronic control function, and a conventional system for implementing an automobile electronic control function may have another variation. For example, FIG. 2 shows another system for implementing an automobile electronic control function, to be specific, the automobile part 130 no longer performs a communication connection with the CCP 110 by using the DC 120, but may directly perform a communication connection with the CCP 110.

Figure 2:
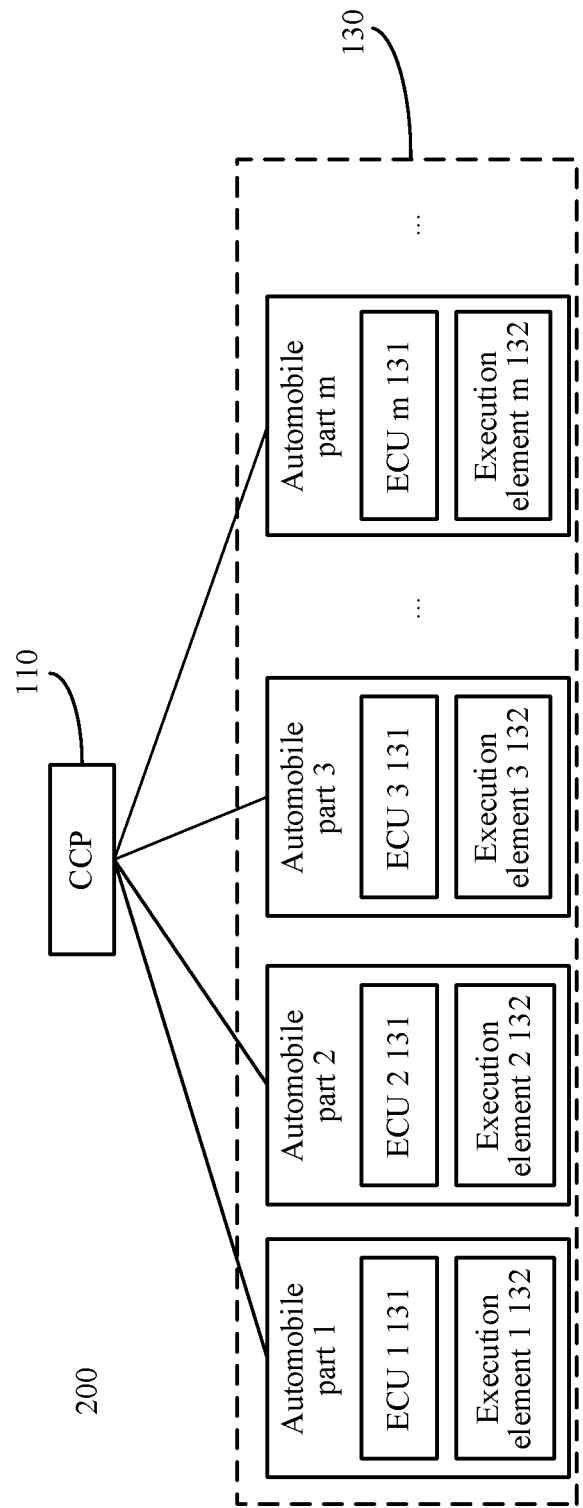
FIG. 2 is a schematic diagram of another conventional system for implementing an automobile electronic control function.

It should be understood that, in the system for implementing the automobile electronic control function shown in FIG. 2, functions of components such as an automobile part and a CCP are similar to or the same as functions of components such as the automobile part and the CCP shown in FIG. 1. For brevity, details are not described herein again.

Either in the system that is for implementing the automobile electronic control function and that is shown in FIG. 1 or the system that is for implementing the automobile electronic control function and that is shown in FIG. 2, to implement electronization of the automobile and meet requirements for implementing various functions of the automobile, each automobile part has an independent ECU. The manner in which ECUs are distributively arranged results in higher costs of the automobile parts.

Besides, in the foregoing manner in which the ECUs are distributively arranged, a length of a harness used for communication between an ECU and a DC and a length of a harness used for communication between an ECU and a CCP in the system for implementing the automobile electronic control function are relatively large. This results in relatively high costs of the system for implementing the automobile electronic control function.

To avoid the foregoing problem, this application proposes a new system for implementing an automobile electronic control function, to be specific, a VIU is added to the system for implementing the automobile electronic control function. The VIU provides part or all of the data processing or control functions for the plurality of automobile parts. In this way, in a solution in which one VIU serves the plurality of automobile parts, an ECU in each automobile part does not need to implement the foregoing data processing function or control function in the conventional system for implementing the automobile electronic control function. This helps reduce costs of the automobile parts.

In another aspect, in the system for implementing the automobile electronic control function provided in this application, the plurality of automobile parts may be connected to one VIU, and connected to a DC or a CCP by using the VIU. Therefore, each automobile part in the conventional system for implementing the automobile electronic control function does not need to be connected to a DC or a CCP by using a respective harness, and this helps reduce the length of the harness in the system for implementing the automobile electronic control function. The following describes, with reference to FIG. 3 and FIG. 4, schematic diagrams of systems for implementing an automobile electronic control function according to this application. A system 300 for implementing an automobile electronic control function shown in FIG. 3 may be understood as an improvement on the system 100 for implementing the automobile electronic control function shown in FIG. 1. A system 400 for implementing an automobile electronic control function shown in FIG. 4 may be understood as an improvement on the system 200 for implementing the automobile electronic control function shown in FIG. 2.

It should be noted that, in the embodiments of this application, the system for implementing the automobile electronic control function may be applied to an intelligent automobile, a new energy automobile, a conventional automobile, or the like. New energy automobiles include a pure electric automobile, an extended-range electric automobile, a hybrid electric automobile, a fuel cell electric automobile, a hydrogen engine automobile, or another new energy automobile. Conventional automobiles include a gasoline automobile, a diesel automobile, and the like. This is not limited in the embodiments of this application.

Figure 3:
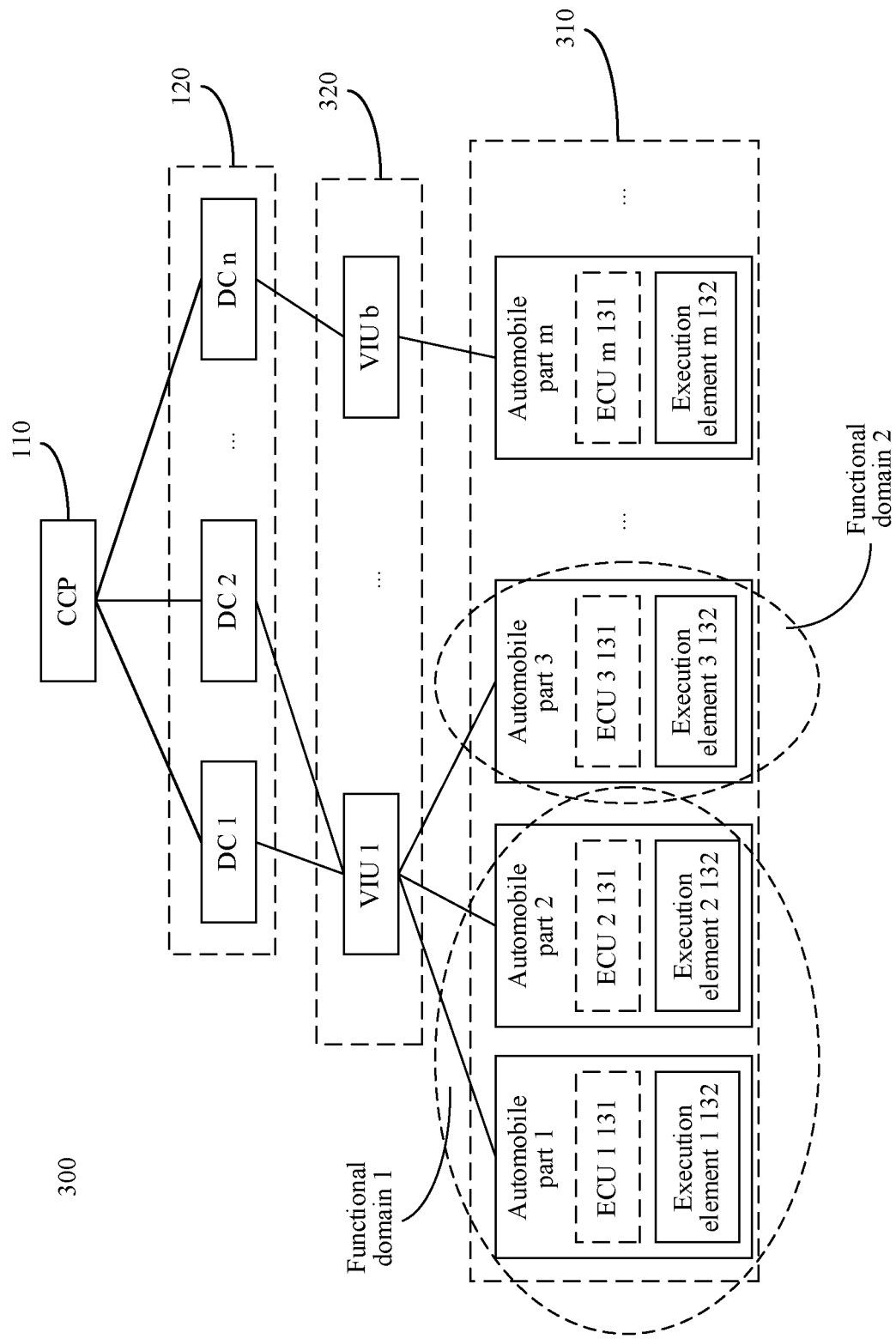
FIG. 3 is a schematic diagram of a system for implementing an automobile electronic control function according to an embodiment of this application.

FIG. 3 is a schematic diagram of a system for implementing an automobile electronic control function according to an embodiment of this application. It should be understood that units that have a same function in the system that is for implementing the automobile electronic control function and that is shown in FIG. 3 and the system that is for implementing the automobile electronic control function and that is shown in FIG. 1 use a same number. For brevity, details are not described herein.

The system 300 for implementing the automobile electronic control function shown in FIG. 3 includes a CCP 110, n DCs 120, m automobile parts 310, and b VIU 320, where b, n, and m are positive integers.

The automobile part 310 may include one or more of the following automobile parts an automobile part having some or all functions of ECUs, and an automobile part without the electronic control function.

It may be understood that the automobile part 310 having all the electronic control functions is the same as the automobile part 130 in FIG. 1.

It may be understood that the automobile part 310 having some of electronic control functions has fewer electronic control functions than the automobile part 130 in FIG. 1.

It may be understood that the automobile part 310 without some of the electronic control functions is the automobile part 310 without an ECU.

The VIU 320 is in communication connection with the plurality of automobile parts 310, and is in communication connection with the DC in the automobile. For example, in FIG. 3, the VIU 1 is in communication connection with an automobile part 1, an automobile part 2, and an automobile part 3, and the VIU 1 is in communication connection with a DC 1 and a DC 2.

It should be noted that the communication connection may be understood as a wireless connection or a wired connection for information exchange. This is not limited in this embodiment of this application. It may be understood that the wireless connection is that the VIU does not need to communicate with another unit in the automobile through a bus. For example, BLUETOOTH communication, or WI-FI communication may be used. It may be understood that the wired connection is that the VIU communicates with another unit in the automobile based on the bus. For example, a controller area network (CAN) bus, a local interconnect network (LIN) bus, or an Ethernet communications technology may be used.

Optionally, the VIU may be in communication connection with a DC in the automobile. For example, a VIU b is in communication connection with a DC n shown in FIG. 3. The VIU may further be in communication connection with a plurality of DCs in the automobile. For example, a VIU 1 shown in FIG. 4 may be in communication connection with the DC 1 and the DC 2.

In the conventional system for implementing the automobile electronic control function, one DC usually communicates with a plurality of automobile parts in one functional domain. As shown in FIG. 1, the DC 1 may be in communication connection with an automobile part 1 and an automobile part 2 in a functional domain 1. To be compatible with the conventional system for implementing the automobile electronic control function, a plurality of automobile parts belonging to one functional domain and a DC corresponding to the functional domain usually communicate with one VIU, so that the DC can control all automobile parts by using one VIU. This reduces changes to the conventional electronic control function system.

Optionally, one VIU may serve any functional domain in the automobile. For example, in the system 300 for implementing the automobile electronic control function shown in FIG. 3, the automobile part 1 and the automobile part 2 that have the communication connection with the VIU 1 belong to a same functional domain, namely, the functional domain 1. In addition, the DC 1 that is in communication connection with the VIU 1 is a DC corresponding to the functional domain 1.

The functional domain served by the VIU may be a vehicle domain. In this case, the VIU may be in communication connection with a VDC, an automobile part in a vehicle body domain, and an automobile part in a chassis domain. The functional domain served by the VIU may be a cockpit domain. In this case, the VIU may be in communication connection with a CDC and an automobile part in the cockpit domain. Alternatively, the functional domain served by the VIU may be an intelligent driving domain. In this case, the VIU may be in communication connection with an MDC and an automobile part in the intelligent driving domain.

Optionally, one VIU may also serve a plurality of functional domains. In other words, the VIU is in communication connection with automobile parts in the plurality of functional domains and DCs. For example, in the system 300 for implementing the automobile electronic control function shown in FIG. 3, the DC 1 is a DC in the functional domain 1, the DC 2 is a DC in a functional domain 2, automobile parts in the functional domain 1 include the automobile part 1 and the automobile part 2, and an automobile part in the functional domain 2 is the automobile part 3. The VIU 1 is in communication connection with the DC 1 and the DC 2. In addition, the VIU 1 is also in communication connection with the automobile parts in the functional domain 1 and the automobile part in the functional domain 2.

The VIU may provide services for two functional domains. In other words, the VIU is in communication connection with automobile parts in the two functional domains and the DCs. The two functional domains may be any two functional domains in the automobile. For example, the foregoing two functional domains may be the vehicle domain and the cockpit domain. In this case, the DCs that are in communication connection with the VIU are the VDC and the CDC. Correspondingly, the automobile parts that are in communication connection with the VIU are the automobile parts in the vehicle body domain, the automobile parts in the chassis domain, and the automobile parts in the cockpit domain.

For another example, the foregoing two functional domains may be the vehicle domain and a MDC. In this case, the DCs that are in communication connection with the VIU are the VDC and the MDC. Correspondingly, the automobile parts that are in communication connection with the VIU are the automobile parts in the vehicle body domain, the automobile parts in the chassis domain, and the automobile parts in the intelligent driving domain.

For another example, the foregoing two functional domains may be the cockpit domain and a MDC. In this case, the DCs that are in communication connection with the VIU are the CDC and the MDC. Correspondingly, the automobile parts that are in communication connection with the VIU are the automobile parts in the cockpit domain and the automobile parts in the intelligent driving domain.

The VIU may provide services for three functional domains. In other words, the VIU is in communication connection with automobile parts in the three functional domains and the DCs. For example, the three functional domains may be the vehicle domain, the cockpit domain, and a self-driving domain. In this case, the DCs that are in communication connection with the VIU are the VDC, the CDC, and the MDC. Correspondingly, the automobile parts that are in communication connection with the VIU are the automobile parts in the vehicle body domain, the automobile parts in the chassis domain, the automobile parts in the cockpit domain, and the automobile parts in the intelligent driving domain.

Certainly, if a conventional electronic function control architecture is not considered, there are many connection manners between the VIU and the automobile part and between the VIU and the DC. This is not limited in this embodiment of this application. For example, a DC corresponding to a functional domain and an automobile part in the functional domain may be connected to different VIUs. For another example, the VIU is in communication connection with only some automobile parts in a functional domain. For another example, an automobile part served by the VIU may have no relationship with a functional domain. The automobile parts served by each VIU may be determined based on other factors such as a physical position of an automobile part in the automobile.

Figure 4:
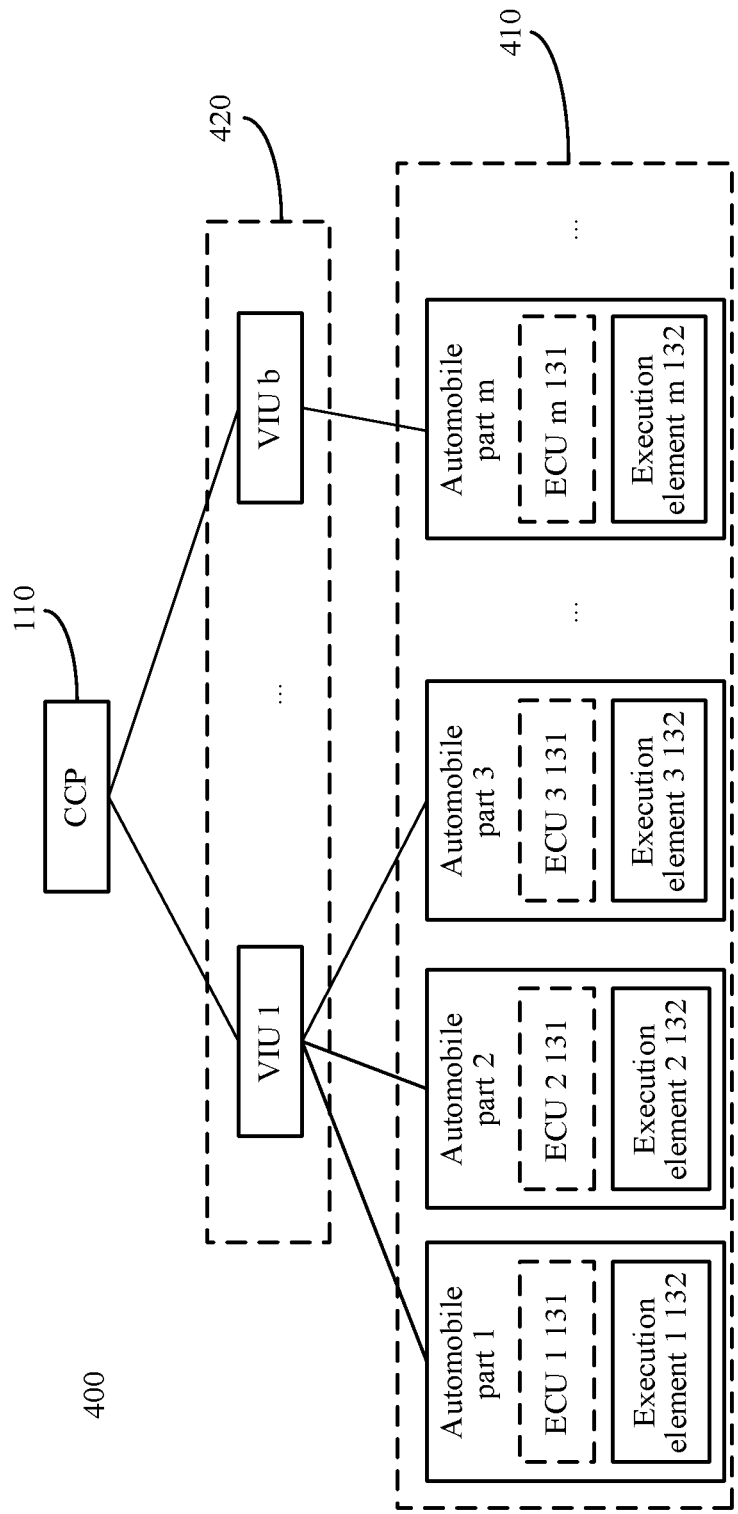
FIG. 4 is a schematic diagram of a system for implementing an automobile electronic control function according to another embodiment of this application.

FIG. 4 is a schematic diagram of a system for implementing an automobile electronic control function according to another embodiment of this application. It should be understood that units that have a same function in the system 400 that is for implementing the automobile electronic control function and that is shown in FIG. 4 and the system 100 that is for implementing the automobile electronic control function and that is shown in FIG. 1 use a same number. For brevity, details are not described herein.

The system 400 for implementing an automobile electronic control function shown in FIG. 4 includes a CCP 110, n DCs 120, m automobile parts 410, and b VIUs 420, where b, n, and m are positive integers.

The automobile part 410 may include one or more of the following automobile parts an automobile part having some or all functions of ECUs, and an automobile part without the electronic control function.

It may be understood that the automobile part 410 having all the electronic control functions is the same as the automobile part 130 in FIG. 1.

It may be understood that the automobile part 410 having some of electronic control functions has fewer electronic control functions than the automobile part 130 in FIG. 1.

It may be understood that the automobile part 410 without some of the electronic control functions is the automobile part 310 without an ECU.

The VIU 420 is in communication connection with a plurality of automobile parts 410, and is in communication connection with the CCP 110 in the automobile. For example, in FIG. 4, a VIU 1 is in communication connection with an automobile part 1, an automobile part 2, and an automobile part 3, and the VIU 1 is in communication connection with the CCP 110.

It should be noted that the communication connection may be understood as a wireless connection or a wired connection. This is not limited in this embodiment of this application. It may be understood that the wireless connection is that the VIU does not need to communicate with another unit in the automobile through a bus. For example, BLUETOOTH communication, or WI-FI communication may be used. It may be understood that the wired connection is that the VIU communicates with the another unit in the automobile based on the bus. For example, a CAN bus, a LIN bus, or an Ethernet communications technology may be used.

Optionally, the VIU may provide services for all or some of the automobile parts in the automobile. When the VIU provides the service for some automobile parts, another automobile part that is in the automobile and that is not in communication connection with the VIU may directly communicate with the CCP, or may communicate with the CCP by using another VIU. This is not limited in this embodiment of this application.

The foregoing separately describes, with reference to FIG. 3 and FIG. 4, the system 300 for implementing the automobile electronic control function and the system 400 for implementing the automobile electronic control function. The following mainly describes commonalities of the foregoing two electronic control architectures.

As described above, either in the system 300 for implementing the automobile electronic control function shown in FIG. 3 or in the system 400 for implementing the automobile electronic control function shown in FIG. 4, the automobile may include one or more VIUs. When the automobile includes one VIU, the VIU may provide services for all or some automobile parts in the automobile. When an automobile includes a plurality of VIUs, different VIUs in the plurality of VIUs may provide services for different automobile parts, or different VIUs in the plurality of VIUs may provide services for at least partially same automobile parts.

It should be noted that, in this embodiment of this application, a quantity of the plurality of VIUs included in the automobile is not specifically limited, for example, may be 2, 3, 4, or 5.

To improve flexibility and reliability of information (including data or control information) transmission in the system for implementing the automobile electronic control function, the plurality of VIUs may communicate with each other. A specific communication manner may be a bus-based communication manner. For example, the VIU communicates with another VIU in the automobile based on the CAN bus. For another example, the VIU communicates with another VIU in the automobile based on the LIN bus. For another example, the VIU communicates with another VIU in the automobile based on a high-speed communication protocol. The high-speed communication protocol may be an Ethernet communication protocol. The foregoing communication manner may also be a wireless communication manner. For example, the VIU may communicate with the another VIU in the automobile based on a BLUETOOTH technology. For another example, the VIU may communicate with the another VIU in the automobile based on a WI-FI technology.

There are a plurality of communication connection manners for the plurality of VIUs. This is not specifically limited in the embodiments of this application. For example, there may be a communication connection between any two VIUs of the plurality of VIUs, or there is a communication connection between one VIU of the plurality of VIUs and the another VIU, or a ring communication network may be formed between the plurality of VIUs.

Optionally, when the foregoing automobile includes the plurality of VIUs, the plurality of VIUs may back up each other according to a preset rule, or one of the plurality of VIUs is specially configured to provide a backup function for the another VIU. The backup function may include, when one of the plurality of VIUs is in an invalid state, the VIU providing the backup function may replace the invalid VIU to control the automobile parts, or provide a data processing function for the automobile parts, to improve reliability of the electronic control function.

Based on the foregoing system 300 for implementing the automobile electronic control function and the foregoing system 400 for implementing the automobile electronic control function, the following describes a method for centralizing electronic control functions of automobile parts according to an embodiment of this application.

To be specific, the plurality of automobile parts in the automobile are classified into a plurality of automobile part sets based on one or more of the following factors. The plurality of automobile part sets include a first automobile part set, and a first VIU is configured to provide a service for a plurality of automobile parts that belong to the first automobile part set. The service may specifically include a control function, a data processing function and the like. For details, refer to the following description.

The foregoing factors include an interface type of an interface of an automobile part in the automobile, a transmission type used by the automobile part in the automobile to transmit data, a manufacturer of the automobile part in the automobile, a type of the automobile part in the automobile, a safety level of the automobile part in the automobile, and a service type of a service to which data transmitted by the automobile part in the automobile belongs, a service level of the service to which the data transmitted by the automobile part in the automobile belongs, a function of the automobile part in the automobile, and a physical position of the automobile part in the automobile.

Based on each of the foregoing factors, the following describes the method for centralizing the electronic control functions of the automobile parts.

Centralization manner 1. The electronic control functions of the automobile parts are centralized based on the interface types of the interfaces of the automobile parts.

The foregoing interface types are interface types of the interfaces used by the automobile parts to send data or receive control information.

The foregoing interface types may include an interface type currently supported by the automobile part during data transmission, for example, a CAN-based interface type, a LIN-based interface type, a FLEXRAY-based interface type, an Ethernet-based interface type, a BLUETOOTH-based interface type, a WI-FI-based interface type, a 5th generation (5G) communication network-based interface type, or a 4th generation (4G) communication network-based interface type. The interface types may further include an interface type supported in a future communication protocol.

That the electronic control functions of the automobile parts are centralized based on the interface types of the interfaces of the automobile parts may be understood as that the interface types of the interfaces of the automobile parts are considered in a process of centralizing the electronic control functions of the automobile parts. For example, electronic control functions of a plurality of automobile parts whose interface types are the same and that are in the automobile are centralized. For another example, according to the preset rule, the interface types of the interfaces of the automobile parts are classified into a plurality of sets, then automobile parts corresponding to a plurality of interface types belonging to a same set are classified into one automobile part set, and finally, electronic control functions of the automobile parts belonging to one automobile part set are centralized and implemented by one VIU. A specific centralization manner based on the interface types of the interfaces is not limited in this embodiment of this application.

For example, if the interface types of the interfaces of the automobile parts in the automobile include the CAN-based interface type and the LIN-based interface type, a plurality of automobile parts whose interface types are the CAN-based interface type may be classified into an automobile part set 1, and a plurality of automobile parts whose interface types are the LIN-based interface type are classified into an automobile part set 2. The automobile part set 1 is served by the VIU 1, and the automobile part set 2 is served by the VIU 2.

In this embodiment of this application, the electronic control functions of the automobile parts are centralized based on the interface types of the interfaces of the automobile parts. This helps simplify complexity of processing information by the VIU.

Centralization manner 2. The electronic control functions of the automobile parts are centralized based on the manufacturers of the automobile parts.

That the electronic control functions of the automobile parts are centralized based on the manufacturers of the automobile parts may be understood as that the manufacturers of the automobile parts are considered in a process of centralizing the electronic control functions of the automobile parts. For example, electronic control functions of a plurality of automobile parts whose manufacturers are the same and that are in the automobile are centralized. For another example, the manufacturers of the foregoing automobile parts are classified into a plurality of sets according to the preset rule, then automobile parts corresponding to a plurality of manufacturers belonging to a same set are classified into one automobile part set, and finally, electronic control functions of the automobile parts belonging to one automobile part set are centralized and implemented by one VIU. A specific centralization manner based on the manufacturers of the automobile parts is not limited in this embodiment of this application.

For example, if automobile parts in the automobile include automobile parts produced by a manufacturer A and automobile parts produced by a manufacturer B, a plurality of automobile parts produced by the manufacturer A may be classified into the automobile part set 1, and a plurality of automobile parts produced by the manufacturer B may be classified into the automobile part set 2. The automobile part set 1 is served by the VIU 1, and the automobile part set 2 is served by the VIU 2.

In this embodiment of this application, the electronic control functions of the automobile parts are centralized based on the manufacturers of the automobile parts. This helps reduce difficulty in centralizing the electronic control functions of the automobile parts. In other words, after negotiation with some manufacturers succeeds, the electronic control functions can be centralized for the automobile parts produced by the manufacturers.

In another aspect, when a VIU provides a service for the automobile parts produced by the manufacturers, the VIU can develop a VIU function together with the manufacturer.

Centralization manner 3. The electronic control functions of the automobile parts are centralized based on the transmission types supported by the automobile parts.

The foregoing transmission types are transmission types used by the automobile parts to send data or receive control information.

The transmission types may include a transmission type currently supported by the automobile part for communication. The transmission types include wired transmission and wireless transmission. The wired transmission may be the CAN bus-based transmission, the LIN bus-based transmission, the FLEXRAY bus-based transmission, or the Ethernet bus-based transmission mentioned above. The wireless transmission may be transmission based on a Bluetooth technology, transmission based on a WI-FI technology, or the like.

That the electronic control functions of the automobile parts are centralized based on the transmission types supported by the automobile parts may be understood as that the transmission types supported by the automobile parts are considered in the process of centralizing the electronic control functions of the automobile parts. For example, electronic control functions of a plurality of automobile parts that support a same transmission type and that are in the automobile are centralized.

For example, if the transmission types supported by the automobile parts in the automobile include the wired transmission and the wireless transmission, a plurality of automobile parts supporting the wired transmission may be classified into the automobile part set 1, and a plurality of automobile parts supporting the wireless transmission may be classified into the automobile part set 2. The automobile part set 1 is served by the VIU 1, and the automobile part set 2 is served by the VIU 2.

In this embodiment of this application, the electronic control functions of the automobile parts are centralized based on the transmission types supported by the automobile parts. This helps simplify complexity of processing information by the VIU.

Centralization manner 4. The electronic control functions of the automobile parts are centralized based on the types of the automobile parts.

The types of the foregoing automobile parts include a camera lens, a millimeter-wave radar, a laser radar, a braking device, a steering device, and the like.

That the electronic control functions of the automobile parts are centralized based on the types of the automobile parts may be understood as that the types of the automobile parts are considered in the process of centralizing the electronic control functions of the automobile parts. For example, electronic control functions of a plurality of automobile parts whose types are the same and that are in the automobile are centralized. For another example, according to the preset rule, the types of the automobile parts are classified into a plurality of sets, then automobile parts corresponding to a plurality of interface types belonging to a same set are classified into one automobile part set, and finally, electronic control functions of the automobile parts belonging to one automobile part set are centralized and implemented by one VIU. A specific centralization manner based on the manufacturers of the automobile parts is not limited in this embodiment of this application.

For example, if the automobile parts in the automobile include automobile parts of a type A and automobile parts of a type B, a plurality of automobile parts corresponding to the type A may be classified into the automobile part set 1, and a plurality of automobile parts corresponding to the type B may be classified into the automobile part set 2. The automobile part set 1 is served by the VIU 1, and the automobile part set 2 is served by the VIU 2.

In this embodiment of this application, the electronic control functions of the automobile parts are centralized based on the types of the automobile parts. This helps simplify complexity of providing the service for the automobile parts by the VIU.

Centralization manner 5. The electronic control functions of the automobile parts are centralized based on the safety levels of the automobile parts.

The safety level of the foregoing automobile part is used to indicate an importance degree of the automobile part in a safety assessment such as risk analysis and a risk assessment of the automobile, for example, an automotive safety integration level (ASIL).

That the electronic control functions of the automobile parts are centralized based on the safety levels of the automobile parts may be understood as that the safety levels of the automobile parts are considered in the process of centralizing the electronic control functions of the automobile parts. For example, electronic control functions of a plurality of automobile parts whose safety levels are the same and that are in the automobile are centralized. For another example, according to the preset rule, the safety levels of the automobile parts are classified into a plurality of sets, then automobile parts corresponding to a plurality of safety levels belonging to a same set are classified into one automobile part set, and finally, electronic control functions of the automobile parts belonging to one automobile part set are centralized and implemented by one VIU. A specific centralization manner based on the safety levels of the automobile parts is not limited in this embodiment of this application.

For example, if the automobile parts in the automobile include automobile parts at a safety level A and automobile parts at a safety level B, the plurality of automobile parts corresponding to the safety level A may be classified into the automobile part set 1, and the plurality of automobile parts corresponding to the safety level B may be classified into the automobile part set 2. The automobile part set 1 is served by the VIU 1, and the automobile part set 2 is served by the VIU 2.

In this embodiment of this application, the electronic control functions of the automobile parts are centralized based on the safety levels of the automobile parts. This helps simplify complexity of providing the service for the automobile parts by the VIU.

Centralization manner 6. The electronic control functions of the automobile parts are centralized based on the service types of the services to which data transmitted by the automobile parts belongs.

The service types of the services to which the data transmitted by the automobile part belongs include a data service and a control service. The service types may further include a service for reporting a running status, a service for reporting environment information, a fault diagnosis service, a fault reporting service, and the like. A manner of classifying the service types is not specifically limited in this embodiment of this application.

That the electronic control functions of the automobile parts are centralized based on the service types of the services to which the data transmitted by the automobile parts belongs may be understood as that the service types of the services to which the data transmitted by the automobile parts belongs are considered in the process of centralizing the electronic control functions of the automobile parts. For example, electronic control functions of a plurality of automobile parts whose service types are the same and that are in the automobile are centralized. For another example, according to the preset rule, the service types of the automobile parts are classified into a plurality of sets, then automobile parts corresponding to a plurality of interface types belonging to a same set are classified into one automobile part set, and finally, electronic control functions of the automobile parts belonging to one automobile part set are centralized and implemented by one VIU. A specific centralization manner based on the service types is not limited in this embodiment of this application.

For example, if the automobile parts in the automobile include automobile parts of a service type A and automobile parts of a service type B, a plurality of automobile parts corresponding to the service type A may be classified into the automobile part set 1, and a plurality of automobile parts corresponding to the service type B may be classified into the automobile part set 2. The automobile part set 1 is served by the VIU 1, and the automobile part set 2 is served by the VIU 2.

In this embodiment of this application, the electronic control functions of the automobile parts are centralized based on the service types. This helps simplify complexity of providing the service for the automobile parts by the VIU.

Centralization manner 7. The electronic control functions of the automobile parts are centralized based on the service levels of the services to which the data transmitted by the automobile parts belongs.

The service level is used to indicate a transmission requirement required for transmitting to-be-transmitted data.

Optionally, the service levels of the services may be classified based on transmission latencies. For example, the service levels may be classified into three levels, a service level 1 corresponds to a service having a high latency requirement, namely, a low latency service, a service level 2 corresponds to a common service, namely, a service having a medium latency requirement, and a service level 3 corresponds to a service having a low latency requirement.

Optionally, the service levels of the services may be classified based on transmission reliability. For example, the service levels may be classified into three levels, a service level 1 corresponds to a service having a high reliability requirement, namely, a high reliability service, a service level 2 corresponds to a common service, namely, a service having a medium reliability requirement, and a service level 3 corresponds to a service having a low reliability requirement.

That the electronic control functions of the automobile parts are centralized based on the service levels may be understood as that the service levels are considered in the process of centralizing the electronic control functions of the automobile parts. For example, electronic control functions of a plurality of automobile parts whose service levels are the same and that are in the automobile are centralized. For another example, according to the preset rule, the safety levels of the automobile parts are classified into a plurality of sets, then automobile parts corresponding to a plurality of service levels belonging to a same set are classified into one automobile part set, and finally, electronic control functions of the automobile parts belonging to one automobile part set are centralized and implemented by one VIU. A specific centralization manner based on the service levels of the automobile parts is not limited in this embodiment of this application.

For example, if the automobile parts in the automobile include automobile parts at a service level A and automobile parts at a service level B, a plurality of automobile parts corresponding to the service level A may be classified into an automobile part set 1, and a plurality of automobile parts corresponding to the service level B may be classified into an automobile part set 2. The automobile part set 1 is served by the VIU 1, and the automobile part set 2 is served by the VIU 2.

In this embodiment of this application, the electronic control functions of the automobile parts are centralized based on the service levels. This helps simplify complexity of providing the service for the automobile parts by the VIU.

Centralization manner 8. The electronic control functions of the automobile parts are centralized based on the functions of the automobile parts.

The functions of the automobile parts may include, for example, implementing a braking function of the automobile, implementing a steering function of the automobile, implementing assisted driving of the automobile, and sensing an external environment of the automobile.

That the electronic control functions of the automobile parts are centralized based on the functions of the automobile parts may be understood as that the functions of the automobile parts are considered in the process of centralizing the electronic control functions of the automobile parts. For example, electronic control functions of a plurality of automobile parts whose functions are the same and that are in the automobile are concentrated. For another example, according to the preset rule, the functions of the automobile parts are classified into a plurality of sets, then automobile parts corresponding to a plurality of service levels belonging to a same set are classified into one automobile part set, and finally, electronic control functions of the automobile parts belonging to one automobile part set are centralized and implemented by one VIU. A specific centralization manner based on the functions of the automobile parts is not limited in this embodiment of this application.

For example, if the automobile includes automobile parts used to implement a function A and automobile parts used to implement a function B, a plurality of automobile parts used to implement the function A may be classified into an automobile part set 1, and a plurality of automobile parts used to implement the function B may be classified into an automobile part set 2. The automobile part set 1 is served by the VIU 1, and the automobile part set 2 is served by the VIU 2.

In this embodiment of this application, the electronic control functions of the automobile parts are centralized based on the functions of the automobile parts. In other words, one VIU is used to perform centralized control and/or data processing on automobile parts having same or similar functions. This helps improve cooperation between the automobile parts.

Centralization manner 9. The electronic control functions of the automobile parts are centralized based on the physical positions of the automobile parts in the automobile.

That the electronic control functions of the automobile parts are centralized based on the physical positions of the automobile parts in the automobile may be understood as that the physical positions are considered in a process of centralizing the electronic control functions of the automobile parts. For example, the automobile may be divided into a plurality of physical areas, and electronic control functions of a plurality of automobile parts located in a same physical area in the automobile are centralized. For another example, according to the preset rule, the plurality of physical areas are classified into a plurality of sets, then automobile parts in a plurality of physical areas belonging to a same set are classified into one automobile part set, and finally, electronic control functions of the automobile parts belonging to one automobile part set are centralized and implemented by one VIU. A specific centralization manner based on the physical positions is not limited in this embodiment of this application.

For example, if the automobile parts in the automobile include automobile parts in a physical area 1 and automobile parts in a physical area 2, a plurality of automobile parts in the physical area 1 may be classified into an automobile part set 1, and a plurality of automobile parts in the physical area 2 may be classified into an automobile part set 2. The automobile part set 1 is served by the VIU 1, and the automobile part set 2 is served by the VIU 2.

In this embodiment of this application, the electronic control functions of the automobile parts are centralized based on the physical positions of the automobile parts. This helps reduce a length of a harness used for communication between the VIU and the plurality of automobile parts in the electronic control system.

In the centralized manner 1 to the centralized manner 9 described above, each centralized manner may be used separately, or may be used together. Optionally, any two of the centralized manner 1 to the centralized manner 9 may be used together. For example, the centralized manner 1 may be combined with the centralized manner 9. Optionally, any three of the centralized manner 1 to the centralized manner 9 may be used together. For example, the centralized manner 5, the centralized manner 6, and the centralized manner 7 are used together. Optionally, any four manners of the centralized manner 1 to the centralized manner 9 may be used together. For example, the centralized manner 5, the centralized manner 6, the centralized manner 7, and the centralized manner 8 are used together. Optionally, the nine manners of the centralization manner 1 to the centralization manner 9 may be used together. This is not specifically limited in this embodiment of this application.

Because there are a plurality of combination manners, cases are not described one by one in this embodiment of this application. For ease of understanding, the following describes only two combination manners with reference to FIG. 5, FIG. 6A, and FIG. 6B.

Combination manner 1. Based on combination of the centralization manner 1 and the centralization manner 8, to be specific, based on the interface types of the interfaces of the automobile parts and the functions of the automobile parts, the electronic control functions of the automobile parts are centralized.

Figure 5:
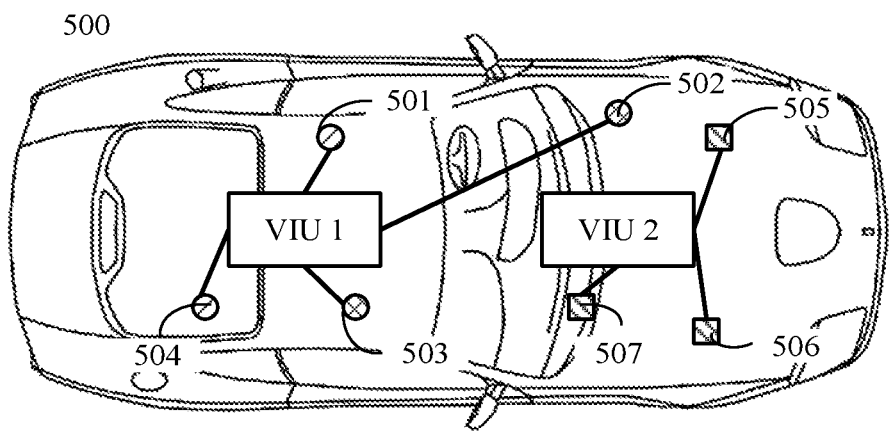
FIG. 5 is a schematic diagram of distribution of automobile parts in an automobile according to an embodiment of this application.

FIG. 5 is a schematic diagram of distribution of automobile parts in an automobile according to an embodiment of this application. It is assumed that an automobile 500 includes seven automobile parts numbered 501 to 507. Interfaces of automobile parts numbered 501 to 504 are CAN-based interfaces, and interfaces of automobile parts numbered 505 to 507 are LIN-based interfaces. In addition, the automobile parts numbered 501 to 504 are used to implement a function A, and the automobile parts numbered 505 to 507 are used to implement a function B.

Therefore, the automobile parts numbered 501 to 504 belong to an automobile part set 1, and the automobile parts numbered 505 to 507 belong to an automobile part set 2. The automobile part set 1 is served by a VIU 1, and the automobile part set 2 is served by a VIU 2.

Combination manner 2. Based on combination of the centralization manner 8 and the centralization manner 9, to be specific, based on the physical positions of the automobile parts in the automobile and the functions of the automobile parts, the electronic control functions of the automobile parts are centralized.

Figure 6A:
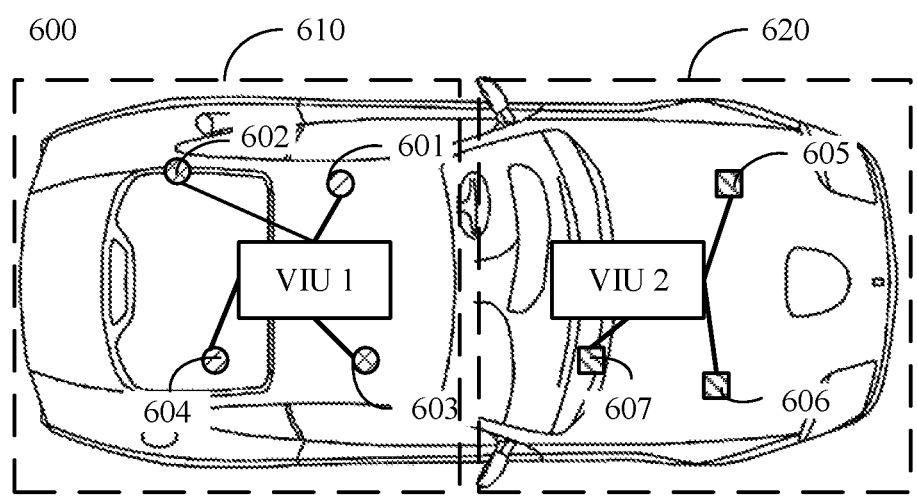
FIG. 6A is a schematic diagram of distribution of automobile parts in an automobile according to an embodiment of this application.

FIG. 6A is a schematic diagram of distribution of automobile parts in an automobile according to an embodiment of this application. It is assumed that an automobile 600 includes seven automobile parts numbered 601 to 607, and is classified into two physical areas. A first physical area 610 is an area including a rear end of the automobile, and a second physical area 620 is an area including a front end of the automobile. Automobile parts numbered 601 to 604 are located in the first physical area 610, and automobile parts numbered 605 to 607 are located in the second physical area 620. In addition, the automobile parts numbered 601 to 604 are used to implement a function A, and the automobile parts numbered 605 to 607 are used to implement a function B.

Therefore, the automobile parts numbered 601 to 604 belong to an automobile part set 1, and the automobile parts numbered 605 to 607 belong to an automobile part set 2. The automobile part set 1 is served by a VIU 1, and the automobile part set 2 is served by a VIU 2.

Figure 6B:
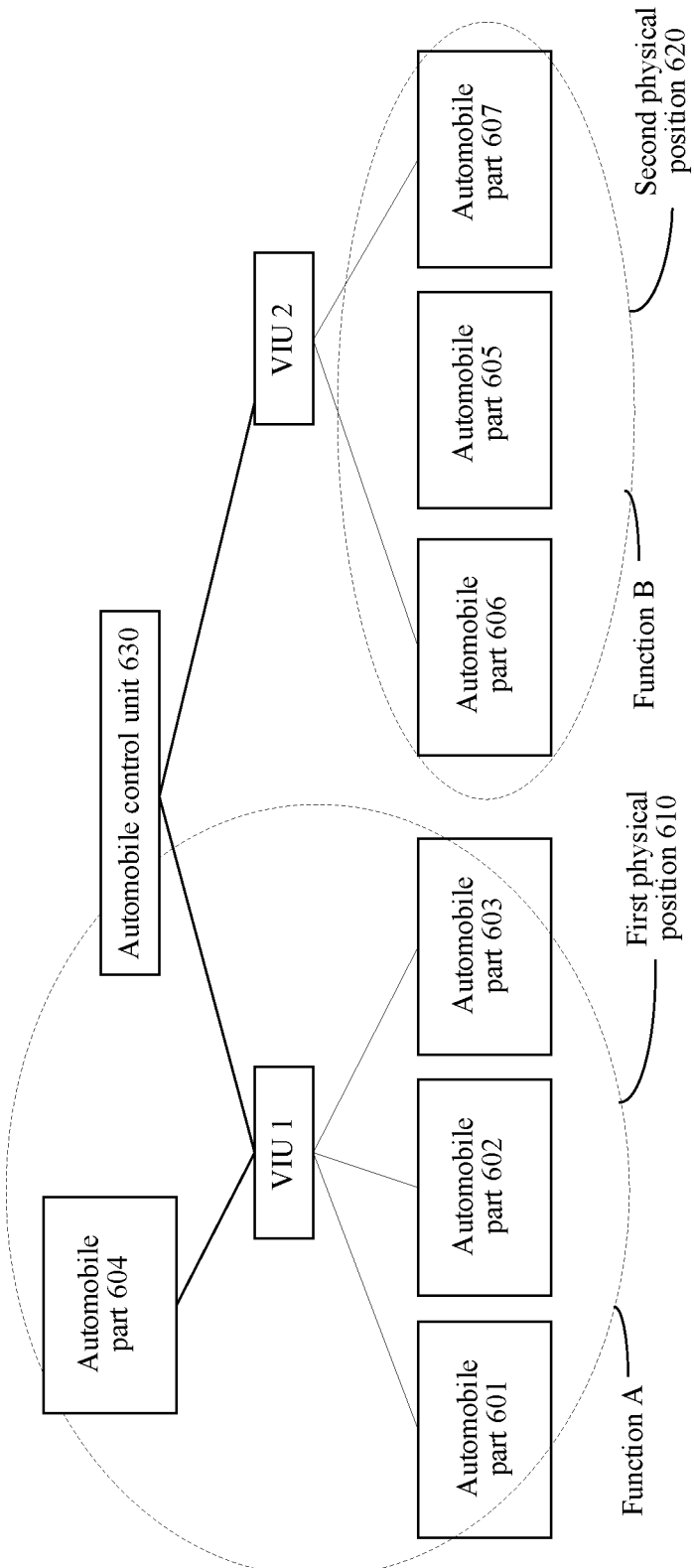
FIG. 6B is a schematic diagram of a system for implementing an automobile electronic control function according to an embodiment of this application.

For ease of understanding, in this application, with reference to FIG. 6B, from a perspective of a topology structure of a system for implementing an automobile electronic control function, a relationship between the VIU 1 and the VIU 2 and the seven automobile parts numbered 601 to 607 is shown. It should be noted that FIG. 6A and FIG. 6B actually describe a same embodiment. FIG. 6B includes an automobile control unit 630, and the automobile control unit 630 may include a DC in the system 300. Alternatively, the automobile control unit 630 may further include a CCP in the system 400.

Figure 7:
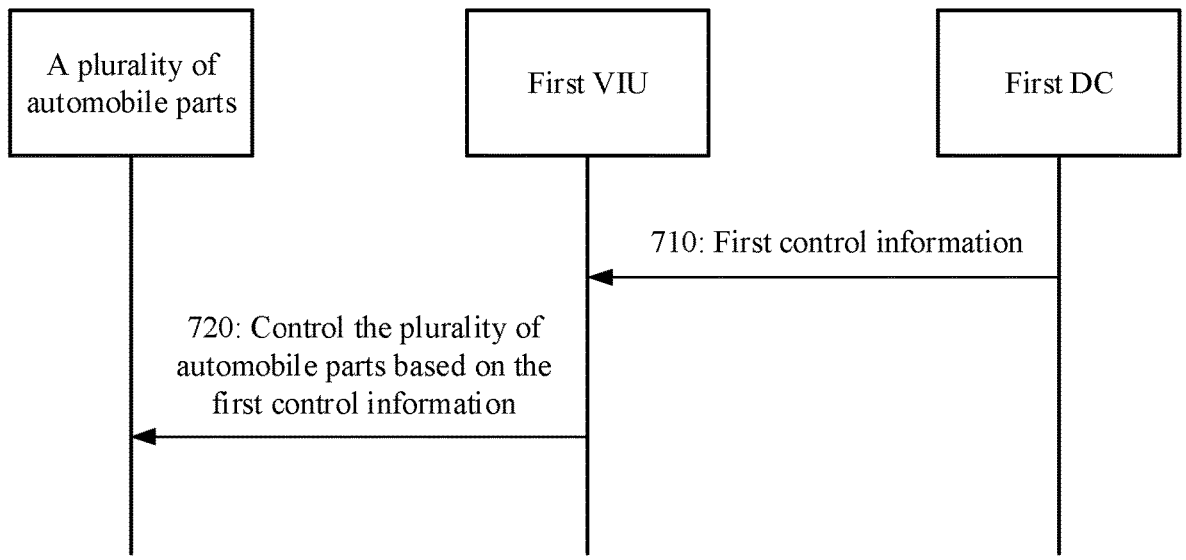
FIG. 7 is a flowchart of a control information transmission method according to an embodiment of this application.
Figure 8:
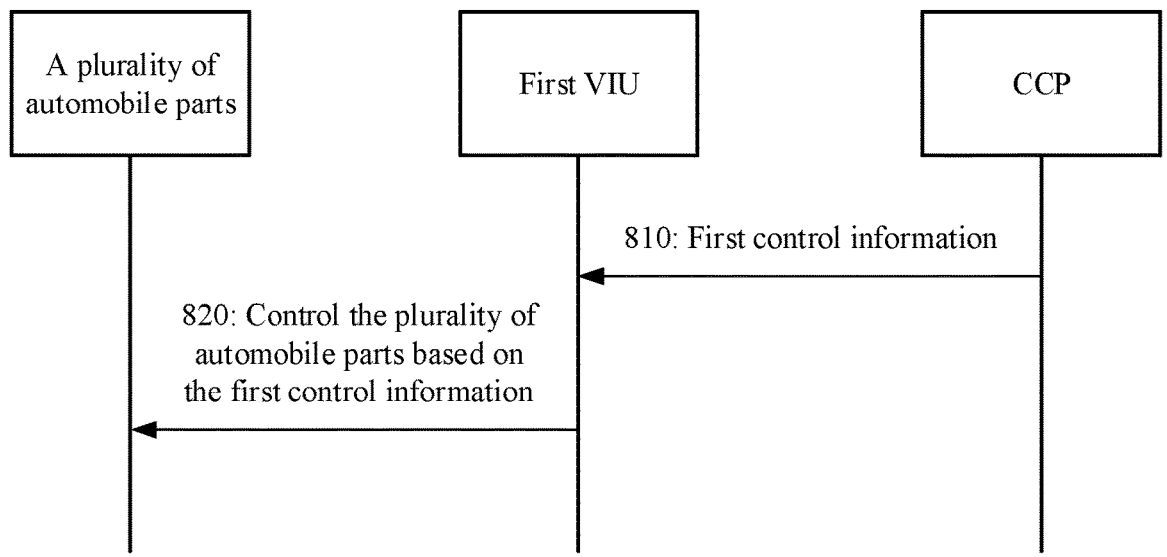
FIG. 8 is a flowchart of a control information transmission method according to an embodiment of this application.

The following describes, with reference to FIG. 7 and FIG. 8, a control information transmission method in an embodiment of this application based on the systems for implementing the automobile electronic control function shown in FIG. 3 to FIG. 6B.

FIG. 7 is a flowchart of a control information transmission method according to an embodiment of this application. It should be understood that the method shown in FIG. 7 may be performed by any VIU in the system 300 for implementing the automobile electronic control function, and is referred to as a "first VIU" below. The method shown in FIG. 7 includes a step 710 and a step 720.

710. A first VIU receives first control information sent by a first DC.

The first DC is a DC that is in communication connection with the VIU. For example, when the first VIU is the VIU 1 shown in FIG. 3, the first DC may be a DC 1 or a DC 2.

Optionally, the first control information may be generated by the first DC, or may be sent by a CCP to the first DC.

720. The first VIU controls a plurality of automobile parts based on the first control information.

The plurality of automobile parts may be all automobile parts in the automobile, or some automobile parts in the automobile. This is not specifically limited in this embodiment of this application.

Optionally, when an electronic control architecture 300 includes a plurality of VIUs, to improve reliability of the electronic control architecture, a second VIU in the plurality of VIUs may provide a backup function for the first VIU.

In other words, the plurality of automobile parts are a first automobile part set, and the automobile further includes a second automobile part set. The first VIU is configured to control the first automobile part set, and the second VIU is configured to control the second automobile part set. If the second VIU fails, the first VIU is further configured to receive control information of the second automobile part set, and control automobile parts in the second automobile part set based on the control information of the second automobile part set.

Optionally, when the electronic function control architecture 300 includes a plurality of VIUs, a third VIU in the plurality of VIUs may provide a backup function for the first VIU. The backup function mainly includes replacing the first VIU to control the plurality of automobile parts. The third VIU may be a VIU that is in the electronic function control architecture 300 and that is specially configured to provide the backup function, to be specific, the third VIU generally does not control the automobile parts, and when a VIU (for example, the first VIU) in the electronic function control architecture 300 fails, the third VIU may replace the first VIU to control the plurality of automobile parts.

FIG. 8 is a flowchart of a control information transmission method according to an embodiment of this application. It should be understood that the method shown in FIG. 8 may be performed by any VIU in the system 400 for implementing the automobile electronic control function, and is referred to as a "first VIU" below. The method shown in FIG. 8 includes a step 810 and a step 820.

810. A first VIU receives first control information sent by a CCP of an automobile.

820. The first VIU controls a plurality of automobile parts based on the first control information.

The plurality of automobile parts may be all automobile parts in the automobile, or some automobile parts in the automobile. This is not specifically limited in this embodiment of this application.

Optionally, when an electronic control architecture 400 includes a plurality of VIUs, to improve reliability of the electronic control architecture, a second VIU in the plurality of VIUs may provide a backup function for the first VIU.

In other words, the plurality of automobile parts are a first automobile part set, and the automobile further includes a second automobile part set. The first VIU is configured to control the first automobile part set, and the second VIU is configured to control the second automobile part set. If the second VIU fails, the first VIU is further configured to receive control information of the second automobile part set, and control automobile parts in the second automobile part set based on the control information of the second automobile part set.

Optionally, when the electronic function control architecture 400 includes a plurality of VIUs, a third VIU in the plurality of VIUs may provide a backup function for the first VIU. The backup function mainly includes replacing the first VIU to control the plurality of automobile parts. The third VIU may be a VIU that is in the electronic function control architecture 400 and that is specially configured to provide the backup function, to be specific, the third VIU generally does not control the automobile parts, and when a VIU (for example, the first VIU) in the electronic function control architecture 400 fails, the third VIU may replace the first VIU to control the plurality of automobile parts.

Optionally, as described above, the first VIU may be in communication connection with a plurality of DCs. For example, DCs that communicate with the first VIU includes a first DC and a second DC. The first VIU is configured to receive a second control information sent by the second DC, and the second control information is used to control some or all of the plurality of automobile parts.

In this embodiment of this application, the VIU is connected to the plurality of DCs, to help improve flexibility and reliability of transmitting the control information in the system for implementing the automobile electronic control function.

Figure 9:
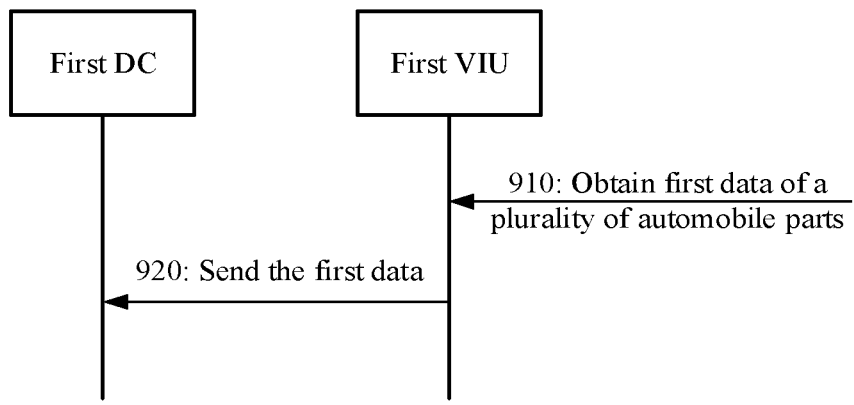
FIG. 9 is a flowchart of a data processing method according to an embodiment of this application.
Figure 10:
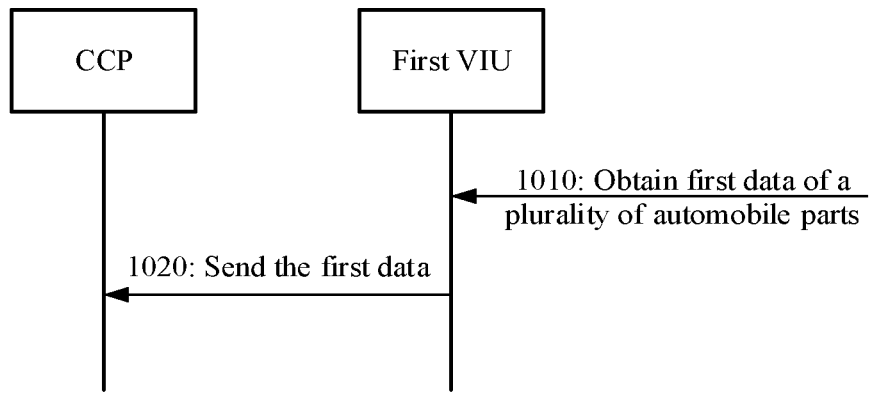
FIG. 10 is a flowchart of a data processing method according to another embodiment of this application.

The following describes a data transmission method in an embodiment of this application with reference to FIG. 9 and FIG. 10 based on the systems for implementing the automobile electronic control function shown in FIG. 3 and FIG. 4. It should be understood that FIG. 9 and FIG. 10 may be separately used in the architectures shown in FIG. 3 and FIG. 4, or may be used in combination with the methods shown in FIG. 7 and FIG. 8. This is not limited in this embodiment of this application.

For ease of understanding, functions of the first VIU in the methods shown in FIG. 9 and FIG. 10 are first described. The following describes a possible function of the VIU from three aspects. It should be understood that the VIU may have one or more of the following functions.

1. An electronic control function. The VIU is used to implement the electronic control function provided by the ECUs inside some or all of the foregoing automobile parts. For example, the VIU has a control function required by an automobile part. For another example, the VIU has a data processing function required by an automobile part.

2. A function that is the same as that of a gateway. The VIU may further have some or all functions that are the same as those of the gateway, for example, a protocol conversion function, a protocol encapsulation and forwarding function, and a data format conversion function.

3. A data processing function across an automobile part. The VIU processes and calculates data obtained from executors in a plurality of automobile parts.

It should be noted that the data in the function and "first data" and "second data" below may include running data of an executor in an automobile part. For example, the data includes a motion parameter of the executor and a working state of the executor. The data in the function may further be data collected by using a data collection unit (for example, a sensible element) of an automobile part. For example, the data may be road information of a road on which the automobile travels that is collected by using the sensible element of the automobile, weather information, or the like. This is not specifically limited in this embodiment of this application.

FIG. 9 is a flowchart of a data processing method according to an embodiment of this application. It should be understood that the method shown in FIG. 9 may be performed by any VIU in the system 300 for implementing the automobile electronic control function, and is referred to as a "first VIU" below. The method shown in FIG. 9 includes a step 910 and a step 920.

910. The first VIU is configured to obtain first data of a plurality of automobile parts.

The first data may be data that is not processed by the first VIU. The first data may further be obtained after the first VIU processes second data. In other words, after obtaining the second data, the first VIU processes the second data to obtain the first data. For a specific processing manner, refer to the description of the VIU function. For brevity, details are not described herein again.

Based on different types of automobile parts, manners of obtaining data by the first VIU are different. It should be understood that the "data" indicates data directly obtained by the first VIU from an automobile part. For example, the data is the second data, or may also indicate the first data when the first VIU does not process the data. The following describes three cases.

If the automobile part is an automobile part that does not include an ECU, or is an automobile part (for example, a control function) that includes only some electronic control functions, the first VIU may directly collect the first data from sensitive elements of the plurality of automobile parts.

If the automobile part is an automobile part that does not include an ECU, or is an automobile part (for example, a control function) that includes only some electronic control functions, the first VIU may directly collect the first data from execution elements of the plurality of automobile parts.

If the automobile part is an automobile part including all electronic control functions, the first VIU may collect the first data from an ECU that implements the electronic control functions.

920. The first VIU is configured to send the first data to a first DC.

After the first VIU sends the first data to the first DC, the first DC may process the first data in a conventional data processing manner, for example, in a data merging manner. For brevity, details are not described herein.

Optionally, when the electronic function control architecture shown in FIG. 3 includes a plurality of VIUs, the first VIU may provide a backup function for a second VIU. The backup function mainly includes replacing the second VIU to provide a data processing function for the automobile parts in the second automobile part set.

In other words, the plurality of automobile parts are a first automobile part set, the automobile further includes the second automobile part set, the first VIU is configured to provide the data processing function for the first automobile part set, the second VIU is configured to provide the data processing function for the second automobile part set, and the first VIU is configured to, if the second VIU fails, obtain data in the second automobile part set, and send the data in the second automobile part set.

Optionally, when the electronic function control architecture 300 includes a plurality of VIUs, a third VIU in the plurality of VIUs may provide a backup function for the first VIU. The backup function mainly includes replacing the first VIU to provide a data processing function for the plurality of automobile parts. The third VIU may be a VIU that is in the electronic function control architecture 300 and that is specially configured to provide the backup function, in other words, the third VIU generally does not provide the data processing service for the automobile parts. When a VIU (for example, the first VIU) in the electronic function control architecture 400 fails, the third VIU may replace the first VIU to provide the data processing function for the plurality of automobile parts.

To improve flexibility of data transmission in the electronic control architecture, the first VIU may be in communication connection with a plurality of DCs, in other words, the first VIU is further configured to send the first data to a second DC. Correspondingly, the second DC may forward the first data to a CCP, or the second DC may further process the first data, for example, perform data fusion and calculation on the first data.

FIG. 10 is a flowchart of a data processing method according to another embodiment of this application. It should be understood that the method shown in FIG. 10 may be performed by any VIU in the system 400 for implementing the automobile electronic control function, and is referred to as a "first VIU" below. The method shown in FIG. 10 includes a step 1010 and a step 1020.

1010. The first VIU is configured to obtain first data of a plurality of automobile parts.

The first data may be data that is not processed by the first VIU. The first data may further be obtained after the first VIU processes second data. In other words, after obtaining the second data, the first VIU processes the second data to obtain the first data. For a specific processing manner, refer to the description of the VIU function. For brevity, details are not described herein again.

Based on different types of automobile parts, manners of obtaining data by the first VIU are different. It should be understood that the "data" indicates data directly obtained by the first VIU from an automobile part. For example, the data is the second data, or may also indicate the first data when the first VIU does not process the data. The following describes three cases.

If the automobile part is an automobile part that does not include an ECU, or is an automobile part (for example, a control function) that includes only some electronic control functions, the first VIU may directly collect the first data from sensitive elements of the plurality of automobile parts.

If the automobile part is an automobile part that does not include an ECU, or is an automobile part (for example, a control function) that includes only some electronic control functions, the first VIU may directly collect the first data from execution elements of the plurality of automobile parts.

If the automobile part is an automobile part including all electronic control functions, the first VIU may collect the first data from an ECU that implements the electronic control functions.

1020. The first VIU is configured to send the first data to a CCP.

After the first VIU sends the first data to the CCP, the CCP may process the first data in a conventional data processing manner, for example, in a data merging manner. For brevity, details are not described herein.

Optionally, when the electronic function control architecture shown in FIG. 4 includes a plurality of VIUs, the first VIU may provide a backup function for a second VIU. The backup function mainly includes replacing the second VIU to provide a data processing function for the automobile parts in the second automobile part set.

In other words, the plurality of automobile parts are a first automobile part set, the automobile further includes the second automobile part set, the first VIU is configured to provide the data processing function for the first automobile part set, the second VIU is configured to provide the data processing function for the second automobile part set, and the first VIU is configured to, if the second VIU fails, obtain data in the second automobile part set, and send the data in the second automobile part set.

Optionally, when the electronic function control architecture 400 includes a plurality of VIUs, a third VIU in the plurality of VIUs may provide a backup function for the first VIU. The backup function mainly includes replacing the first VIU to provide a data processing function for the plurality of automobile parts. The third VIU may be a VIU that is in the electronic function control architecture 400 and that is specially configured to provide the backup function, in other words, the third VIU generally does not provide the data processing service for the automobile parts. When a VIU (for example, the first VIU) in the electronic function control architecture 400 fails, the third VIU may replace the first VIU to provide the data processing function for the plurality of automobile parts.

The foregoing describes, with reference to FIG. 1 to FIG. 10, the system and the method for implementing the electronic control function in the embodiments of this application. The following describes, with reference to FIG. 11 and FIG. 12, VIUs in the embodiments of this application. It should be understood that block diagrams of the VIUs shown in FIG. 11 and FIG. 12 are applicable to any VIU in the system 300 or the system 400.

Figure 11:
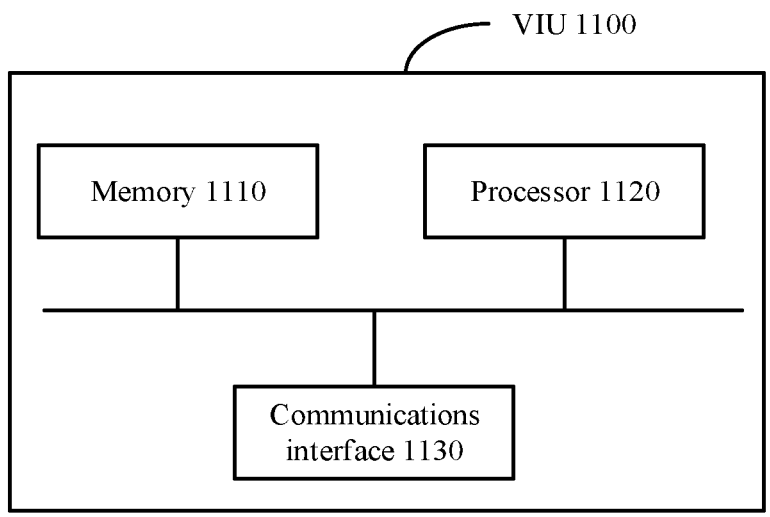
FIG. 11 is a schematic block diagram of a VIU according to an embodiment of this application.
Figure 12:
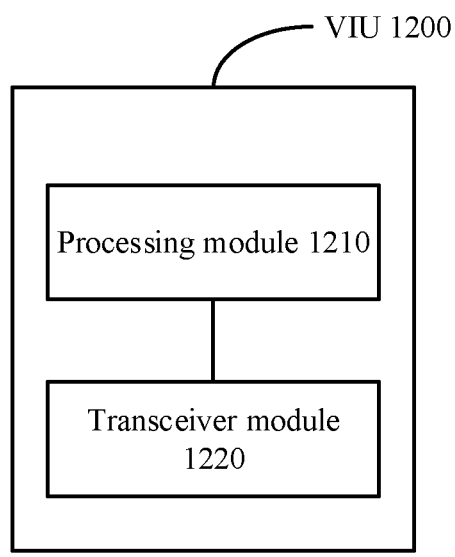
FIG. 12 is a schematic block diagram of a VIU according to an embodiment of this application.

FIG. 11 is a schematic block diagram of a VIU according to an embodiment of this application. The VIU 1100 shown in FIG. 11 may include a memory 1110, a processor 1120, and a communications interface 1130. The memory 1110, the processor 1120, and the communications interface 1130 are connected by using an internal connection path. The memory 1110 is configured to store an instruction. The processor 1120 is configured to execute the instruction stored in the memory 1120, to control the communications interface 1130 to receive/send data or control information. Optionally, the memory 1110 may be coupled to the processor 1120 by using an interface, or may be integrated with the processor 1120.

Optionally, the VIU 1100 may implement various functions implemented by the foregoing VIU. For example, the communications interface 1130 may perform the operations performed by the first VIU in the step 710 and the step 720. For another example, the communications interface 1130 may perform the operations performed by the first VIU in the step 810 and the step 820. For another example, the communications interface 1130 may perform the operations performed by the first VIU in the step 910 and the step 920. For another example, the communications interface 1130 may perform the operations performed by the first VIU in the step 1010 and the step 1020.

It should be noted that the communications interface 1130 uses a transceiver apparatus such as but not limited to a transceiver to implement communication between a communications device 1100 and another device or a communication network. The communications interface 1130 may further include an input/output interface (input/output interface).

In an implementation process, the steps in the foregoing methods can be implemented by using a hardware integrated logical circuit in the processor 1120, or by using instructions in a form of software. The method of the communication disclosed with reference to the embodiments of this application may be directly performed by a hardware processor, or may be performed by using a combination of hardware in the processor and a software module. A software module may be located in a mature storage medium in the art, such as a RAM, a flash memory, a ROM, a programmable ROM, an electrically erasable programmable memory, or a register. The storage medium is located in the memory 1110, and a processor 1120 reads information in the memory 1110 and completes the steps in the foregoing methods in combination with hardware of the processor. To avoid repetition, details are not described herein again.

It should be understood that, the processor in the embodiments of this application may be a central processing unit (CPU), or may further be another general purpose processor, a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It should also be understood that in the embodiments of this application, the memory may include a ROM and a RAM, and provide an instruction and data to the processor. A part of the processor may further include a non-volatile RAM. For example, the processor may further store information of a device type.

In an optional embodiment, the processor 1120 may be a processing module 1210, and the communications interface 1130 may be a transceiver module 1220. Details are shown in FIG. 12.

FIG. 12 is a schematic block diagram of a VIU according to an embodiment of this application. The VIU 1200 shown in FIG. 12 includes a processing module 1210 and a transceiver module 1220.

Optionally, the VIU 1200 may transmit the foregoing data or control information by using the transceiver module 1220, and implement the data processing function, the control function, or the like described above by using the processing module 1210. For example, the transceiver module 1220 may perform the operations performed by the first VIU in the step 710 and the step 720. For another example, the transceiver module 1220 may perform the operations performed by the first VIU in the step 810 and the step 820. For another example, the transceiver module 1220 may perform the operations performed by the first VIU in the step 910 and the step 920. For another example, the transceiver module 1220 may perform the operations performed by the first VIU in the step 1010 and the step 1020.

The term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit classification is merely logical function classification and may be other classification in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system for implementing an automobile electronic control function on an automobile, wherein the system comprises:
   a plurality of part sets in the automobile, wherein the plurality of part sets comprises a first part set comprising a first plurality of automobile parts, and wherein the plurality of part sets are obtained by classifying a second plurality of automobile parts that are located on the automobile based on one or more of the following factors: an interface type of the second plurality of automobile parts, a transmission type used by the second plurality of automobile parts—to transmit data, a manufacturer of the second plurality of automobile parts, a type of the second plurality of automobile parts, a safety level of the second plurality of automobile parts, a service type of a service associated with the data, or a service level of the service associated with the data; and
   a vehicle integration unit (VIU) coupled to the first plurality of automobile parts and configured to:
      obtain control information of the first plurality of automobile parts; and
      control the first plurality of automobile parts based on the control information.

2. The system of claim 1, wherein the factors further comprise functions of the second plurality of automobile parts.

3. The system of claim 1, wherein the factors further comprise physical positions of the second plurality of automobile parts.

4. The system of claim 1, wherein the VIU is further configured to implement some of a plurality of electronic control functions of the first plurality of automobile parts.

5. The system of claim 1, wherein the VIU is further configured to implement all of a plurality of electronic control functions of the first plurality of automobile parts.

6. A system for implementing an automobile electronic control function on an automobile, the system comprising:

a plurality of part sets of the automobile, wherein the plurality of part sets comprises a first part set comprising a first plurality of automobile parts, and wherein the plurality of part sets are obtained by classifying a second plurality of automobile parts that are located on the automobile based on one or more of the following factors: an interface type of the second plurality of automobile parts, a transmission type used by the second plurality of automobile parts to transmit first data, a manufacturer of the second plurality of automobile parts, a type of the second plurality of automobile parts, a safety level of the second plurality of automobile parts a service type of a service associated with the first data, or a service level of the service associated with the first data; and a vehicle integration unit (VIU) coupled to the first plurality of automobile parts and configured to:
  obtain second data from the first plurality of automobile parts; and
  process the second data.

7. The system of claim 6, wherein the factors further comprise functions of the second plurality of automobile parts.

8. The system of claim 6, wherein the factors further comprise physical positions of the second plurality of automobile parts.

9. The system of claim 6, wherein the VIU is further configured to:
  implement some of a plurality of electronic control functions of the first plurality of automobile parts; or
  implement all of the electronic control functions of the first plurality of automobile parts.

10. The system of claim 6, wherein the VIU is further configured to perform one or more of:
  data processing on the second data;
  protocol conversion on the second data;
  encapsulation of the second data according to a transmission protocol; or
  data format conversion on the second data.

11. A method for implementing an automobile electronic control function of an automobile, wherein the automobile comprises a plurality of part sets, wherein the plurality of part sets comprises a first part set comprising a first plurality of automobile parts, and wherein the plurality of part sets are obtained by classifying a second plurality of automobile parts that are located on the automobile based on one or more of the following factors: an interface type of the second plurality of automobile parts, a transmission type used by the second plurality of automobile parts—to transmit data, a manufacturer of the second plurality of automobile parts, a type of the second plurality of automobile parts, a safety level of the second plurality of automobile parts, a service type of a service associated with the data, or a service level of the service associated with the data, and wherein the method comprises:
  obtaining, by a vehicle integration unit (VIU) located on the automobile, control information of the first plurality of automobile parts coupled to the VIU; and
  controlling, by the VIU, the first plurality of automobile parts based on the control information.

12. The method of claim 11, wherein the factors further comprise functions of the second plurality of automobile parts.

13. The method of claim 11, wherein the factors further comprise physical positions of the second plurality of automobile parts.

14. The method of claim 11, further comprising implementing, by the VIU, some of a plurality of electronic control functions of the first plurality of automobile parts.

15. The method of claim 11, further comprising implementing, by the VIU, all of a plurality of electronic control functions of the first plurality of automobile parts.

16. A method for implementing an automobile electronic control function of an automobile, wherein the automobile comprises a plurality of part sets, wherein the plurality of part sets comprises a first part set comprising a first plurality of automobile parts, and wherein the plurality of part sets are obtained by classifying a second plurality of automobile parts that are located on the automobile based on one or more of the following factors: an interface type of the second plurality of automobile parts, a transmission type used by the second plurality of automobile parts—to transmit data, a manufacturer of the second plurality of automobile parts, a type of the second plurality of automobile parts, a safety level of the second plurality of automobile parts, a service type of a service associated with the data, or a service level of the service associated with the data, and wherein the method comprises:
  obtaining, by a vehicle integration unit (VIU) located on the automobile, first data from the first plurality of automobile parts coupled to the VIU; and
  processing, by the VIU, the first data.

17. The method of claim 16, wherein the factors further comprise functions of the second plurality of automobile parts.

18. The method of claim 16, wherein the factors further comprise physical positions of the second plurality of automobile parts.

19. The method of claim 16, further comprising:
  implementing, by the VIU, some of a plurality of electronic control functions of the first plurality of automobile parts; or
  implementing, by the VIU, all of the electronic control functions of the first plurality of automobile parts.

20. The method of claim 16, further comprising one or more of:
  performing, by the VIU, data processing on the first data;
  performing, by the VIU, protocol conversion on the first data;
  encapsulating, by the VIU, the first data according to a transmission protocol; or
  performing, by the VIU, data format conversion on the first data.

* * * * *

UNITED STATES PATENT AND TRADEMARK OFFICE
CERTIFICATE OF CORRECTION

PATENT NO. : 11,433,833 B2
APPLICATION NO. : 17/336869
DATED : September 6, 2022
INVENTOR(S) : Jianyong Cai et al.

Page 1 of 1

It is certified that error appears in the above-identified patent and that said Letters Patent is hereby corrected as shown below:

In the Claims

Claim 1, Column 30, Line 41: "automobile parts-to transmit" should read "automobile parts to transmit"

Claim 11, Column 31, Line 49: "automobile parts-to transmit" should read "automobile parts to transmit"

Claim 16, Column 32, Line 25: "automobile parts-to transmit" should read "automobile parts to transmit"

Signed and Sealed this
Eighth Day of November, 2022

Katherine Kelly Vidal
*Director of the United States Patent and Trademark Office*